United States Patent
Mushtaq

(10) Patent No.: US 11,595,437 B1
(45) Date of Patent: Feb. 28, 2023

(54) METHOD AND SYSTEM FOR STOPPING MULTI-VECTOR PHISHING ATTACKS USING CLOUD POWERED ENDPOINT AGENTS

(71) Applicant: SlashNext, Inc., Pleasanton, CA (US)

(72) Inventor: Atif Mushtaq, San Ramon, CA (US)

(73) Assignee: SLASHNEXT, INC., Pleasanton, CA (US)

( * ) Notice: Subject to any disclaimer, the term of this patent is extended or adjusted under 35 U.S.C. 154(b) by 93 days.

(21) Appl. No.: 17/235,546

(22) Filed: Apr. 20, 2021

Related U.S. Application Data

(60) Provisional application No. 63/013,905, filed on Apr. 22, 2020.

(51) Int. Cl.
*H04L 9/40* (2022.01)
*H04L 41/16* (2022.01)
*H04L 41/22* (2022.01)

(52) U.S. Cl.
CPC .......... *H04L 63/1483* (2013.01); *H04L 41/16* (2013.01); *H04L 41/22* (2013.01); *H04L 63/1408* (2013.01); *H04L 63/1416* (2013.01); *H04L 63/1425* (2013.01); *H04L 63/1441* (2013.01); *H04L 63/20* (2013.01)

(58) Field of Classification Search
CPC ..... H04L 41/22; H04L 41/16; H04L 63/1483; H04L 63/123; H04L 63/1408; H04L 63/1416; H04L 63/1425; H04L 63/1441; H04L 63/20
See application file for complete search history.

(56) References Cited

U.S. PATENT DOCUMENTS

| | | | |
|---|---|---|---|
| 9,258,261 B1 | 2/2016 | O'Connor | |
| 10,313,387 B1 | 6/2019 | Kras | |
| 10,362,047 B2 | 7/2019 | Lowry et al. | |
| 10,404,723 B1 | 9/2019 | Mushtaq | |
| 10,469,519 B2 | 11/2019 | Irimie et al. | |
| 10,764,313 B1 | 9/2020 | Mushtaq | |
| 11,381,597 B2* | 7/2022 | Lancioni | H04L 63/1433 |
| 2019/0173918 A1 | 6/2019 | Sites | |
| 2019/0268302 A1 | 8/2019 | McDonald | |
| 2020/0036751 A1* | 1/2020 | Kohavi | H04L 63/1483 |
| 2021/0144174 A1* | 5/2021 | N | G06F 16/955 |
| 2021/0176272 A1* | 6/2021 | Maha | H04L 63/168 |

* cited by examiner

*Primary Examiner* — Muhammad Raza
(74) *Attorney, Agent, or Firm* — Wilson Sonsini Goodrich & Rosati

(57) ABSTRACT

An endpoint protection system is provided. The system comprises: an endpoint agent deployed to an endpoint device, wherein the endpoint agent is built-into one or more existing applications running on the endpoint device and is configured to capture network session activity between the endpoint device and one or more internet servers to detect a phishing attack using a set of machine learning algorithm trained classifiers, and block the phishing attack; and an endpoint management system in remote communication with the endpoint agent, wherein the endpoint management system is configured to train and develop the set of classifiers, and receive information about the detected phishing attack and an incident report from the endpoint agent, the endpoint agent provides a graphical user interface running on the endpoint device allowing an end user to configure one or more protections provided by the endpoint agent.

12 Claims, 29 Drawing Sheets

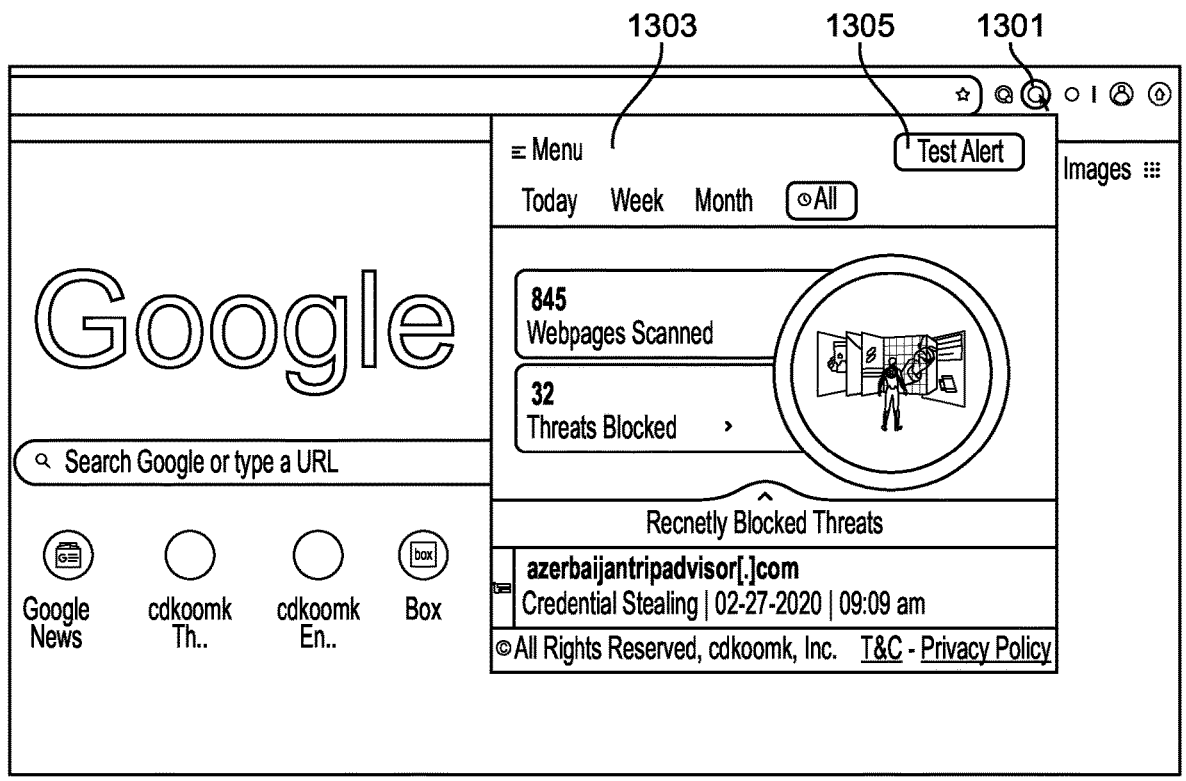
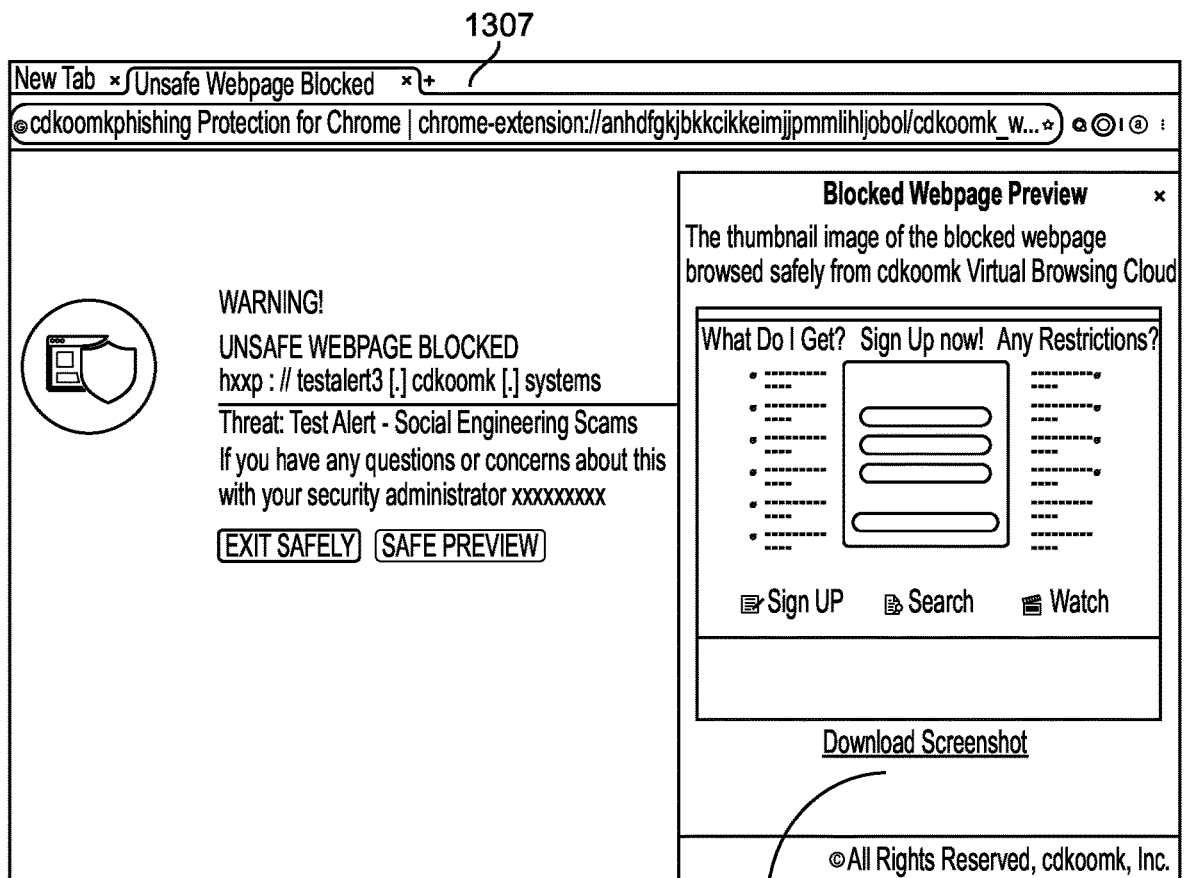
FIG. 13

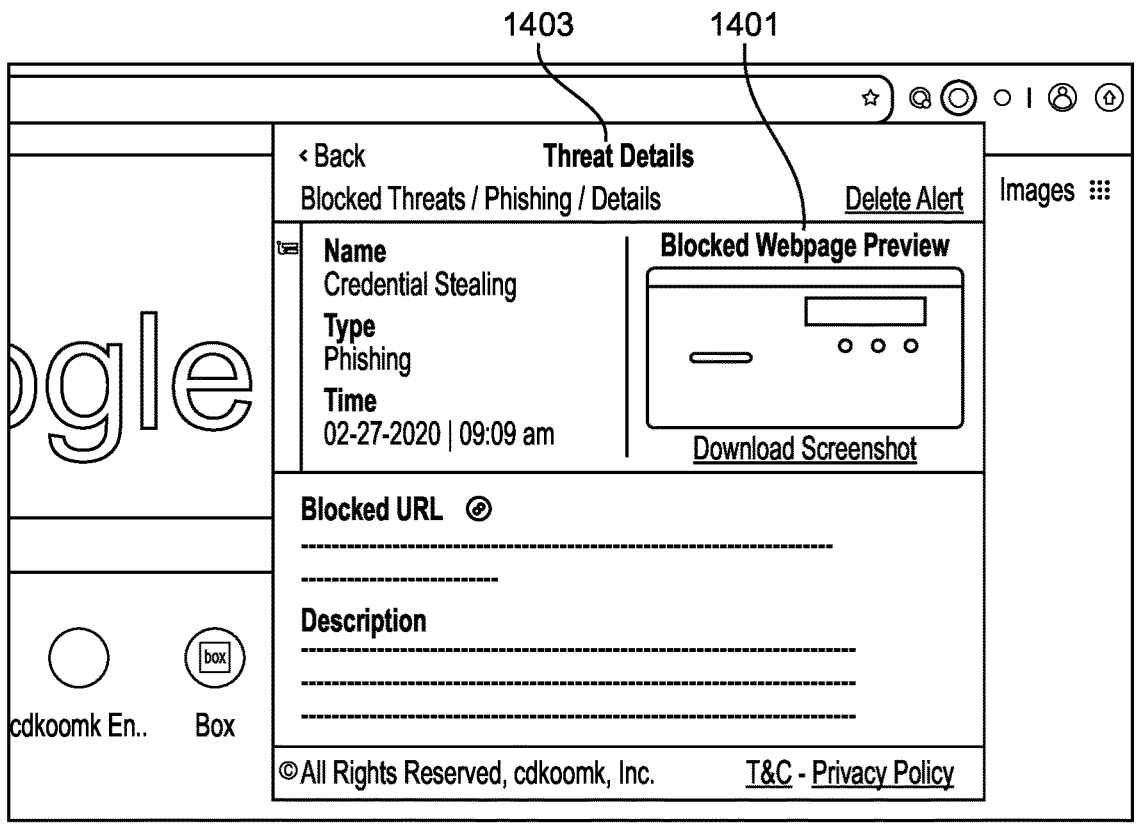
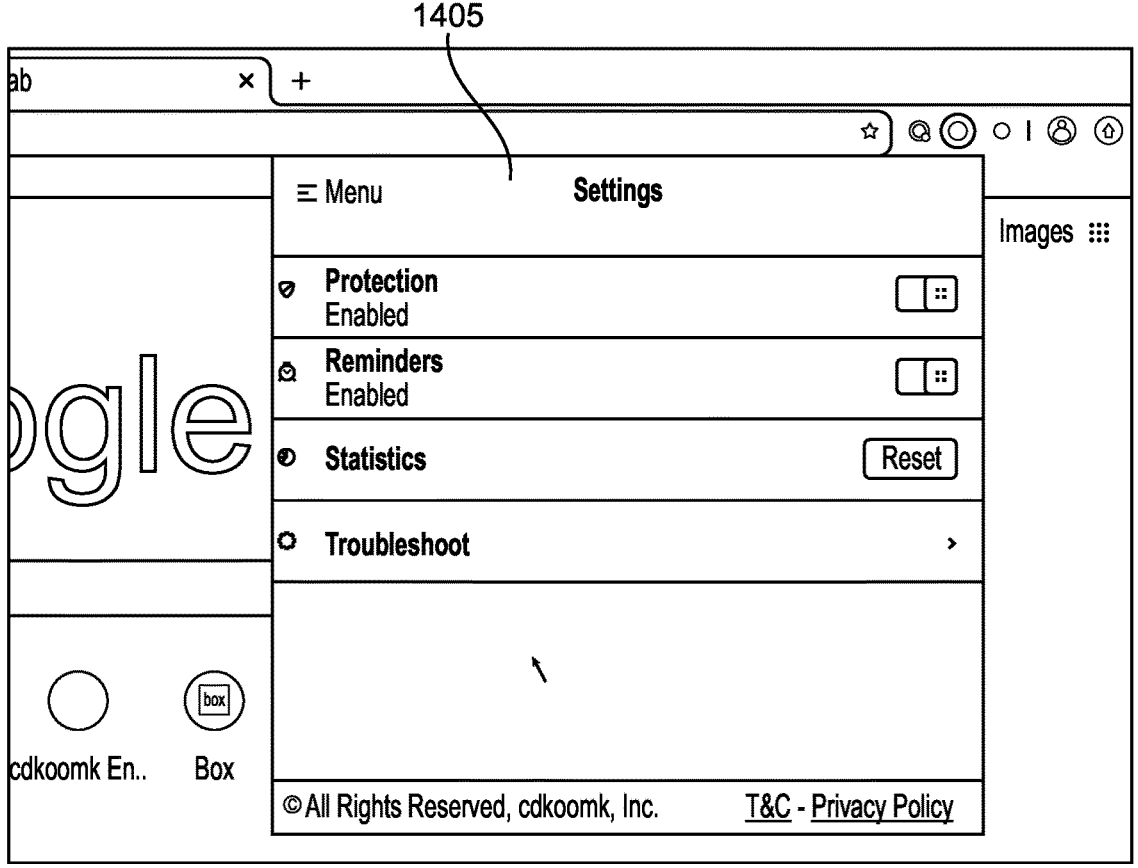
FIG. 14

Users | Threats | EndPoints | 1 Month

Infection Vectors
- 230 Phishing Links
- 32 SMS Phishing

Threats Timeline — Month
— Phishing  — Scareware  — Rogueware  — Other

Recent Threats
← Prev 1 2 3 4 ...... 17 Next →

Threat Name: Fake Login

Phishing URL: www.google.com/index.php

Users Targeted (3)
- Alex Wanger — Engineering
- John Doe — Marketing & Sales
- Maria Heather — Human Resource Sign Up | Search | Watch Download

Threats
- Phishing — 12 Incidents — 15 Users Targeted
- Scareware — 12 Incidents — 15 Users Targeted
- Rogueware — 12 Incidents — 15 Users Targeted
- Others — 12 Incidents — 15 Users Targeted

Incidents

| ⊙Targeted Users | ⊙User Group | ⊙User History | ⊙Blocked Threat | ⊙Incident Time | ⊙EndPoint |
|---|---|---|---|---|---|
| Alex Wanger<br>alex_wanger_12637@company.com | Marketing<br>Group ▽ | 01<br>Past Incidents | Fake Login Page<br>Phising Link | Jan-22-2020<br>11:39 am | Android |
| John Doe<br>alex_wanger_12637@company.com | Search:<br>Marketing<br>Sales<br>Engineering | 02<br>Past Incidents | Rogue software<br>Phising SMS | Jan-22-2020<br>11:39 am | Android |
| Alex Wanger<br>alex_wanger_12637@company.com | | 02<br>Past Incidents | Fake Login Page<br>Phising SMS | Jan-22-2020<br>11:39 am | Chrome |
| John Doe<br>alex_wanger_12637@company.com | Sales<br>Group | 02<br>Past Incidents | Rogue software<br>Phising Link | Jan-22-2020<br>11:39 am | iOS |
| Alex Wanger<br>alex_wanger_12637@company.com | Marketing<br>Group | 01<br>Past Incidents | Fake Login Page<br>Phising Link | Jan-22-2020<br>11:39 am | iOS |
| John Doe<br>alex_wanger_12637@company.com | Sales<br>Group | 02<br>Past Incidents | Rogue software<br>Phising SMS | Jan-22-2020<br>11:39 am | Chrome |
| Alex Wanger<br>alex_wanger_12637@company.com | Marketing<br>Group | 02<br>Past Incidents | Fake Login Page<br>Phising Link | Jan-22-2020<br>11:39 am | Android |

Showing 41 to 48 of 57 entries

← Prev 1 2 .. ⑩ .. 16 17 Next →

Incidents

| ⊕ Targeted Users | ⊕ User Group | ⊕ User History | |
|---|---|---|---|
| 🖥 \| Alex Wanger alex_wanger_12637@company.com | Marketing Group | 01 Past Incidents | F P |
| ⚐ \| John Doe alex_wanger_12637@company.com | Sales Group | 02 Past Incidents | R P |
| 🖥 \| Alex Wanger alex_wanger_12637@company.com | Marketing Group | 02 Past Incidents | F P |
| 🖥 \| John Doe alex_wanger_12637@company.com | Sales Group | 02 Past Incidents | R P |
| 🖥 \| Alex Wanger alex_wanger_12637@company.com | Marketing Group | 01 Past Incidents | F P |
| ⚐ \| John Doe alex_wanger_12637@company.com | Sales Group | 02 Past Incidents | R P |
| 🖥 \| Alex Wanger alex_wanger_12637@company.com | Marketing Group | 02 Past Incidents | F P |

Showing 41 to 48 of 57 entries

---

⟲ Threat  @ User  ⛨ Incident     ✕

Alex Wagner  alex.wagner@email.com
User            Email

+1-315-876-9087  Engineering
Phone                Group

Sales
Department

User Risk Score  |  High

3 Incidents       30 Incidents
Last 30 Days          Total

Close

Malicious Webpage Screenshot

*Browsed Safely from Virtual Browsing Cloud

---

Threat Name  
Credential Stealing

Threat Blocked By  
Browser Protection for Chrome v2.0 (284)

Blocked Webpage  
"hxxp://mylisini[.]co[.]uk/wp-admin"

---

Attack Target

| | |
|---|---|
| User | |
| Email | .com |
| Phone | (800) 930-8643 |
| Department | |
| Device | Chrome 80.0.3987.163 - MacOS Macintosh X 10.14.4 |

METHOD AND SYSTEM FOR STOPPING MULTI-VECTOR PHISHING ATTACKS USING CLOUD POWERED ENDPOINT AGENTS

CROSS-REFERENCE TO RELATED APPLICATIONS

This application claims the priority and benefit of U.S. Provisional Application No. 63/013,905 filed on Apr. 22, 2020, the entire content of which is incorporated herein by reference.

BACKGROUND OF INVENTION

Modern day hackers can attempt to infiltrate computer systems using a variety of network-based cyber attacks. These malicious attacks can be conducted to perform different types of malicious activities like Data Theft, Spam, Click-Fraud, Espionage, Ransom, Data Destruction etc. Although anti-virus software has been available since the late 1990's and more recently, Intrusion Prevention Systems (IPS), Sandbox based Web MPS, and Next Generation Firewalls have attempted to add protection against certain attacks such as, for example certain types of malware, none of these systems has been able to provide sufficient protection against the current generation of cyber attacks.

There are many types of network-based cyber attacks including for example Drive-By Exploits, Malicious Binaries, Data Exfiltration, Social Engineering and Credential Stealing Attacks. Modern day hackers try to infiltrate computer systems using a variety of attacks including but not limited to Drive-by Exploits, Malicious Binaries, Data Exfiltration, Social Engineering and Credential Stealing attacks.

These malicious attacks can be delivered through multiple types of protocols like HTTP, HTTPS/TLS/SSL, SMB, RPC, FTP, SMTP, DNS etc. designed to target multiple types of operating systems like Windows, Linux, Android, iOS, IOT devices and SCADA systems.

Drive-By Exploits usually try to compromise users' browsers by exploiting a variety of software vulnerabilities within browsers' code, plugins and operating system underneath. End goal is to exploits these vulnerabilities and run a remote shell code within browse memory that can download and install additional malicious executables on the compromised system. Most of these software exploits are delivered through malicious web sites using HTTP or HTTPS protocols. Executables delivered through these exploits can be of different types depending on the target OS, like Widows PE format, Linux ELF, OSX MACH-O, Android APK etc.

Malicious binaries are standard OS executable used to compromise a system permanently. Malicious executables or binaries can be of different types depending on the target OS, like Windows PE format, Linux ELF, MACH-O, APK designed to carry different types of malicious activities like Data Theft, Spam, Click-Fraud, Espionage, Ransom, Data Destruction etc. These malicious binaries can be delivered to target systems though Drive-by or Social Engineering Attacks (SEAs). In some cases, a malicious binary can be downloaded and installed by malware already installed on the system to increase the attacks surface or as an update.

Data Exfiltration is the end game for most of the cyber attacks, the aim of the attackers is often to steal Victim's personal information once this information is gathered from the infected machine or from the surrounding network. It is uploaded to a remote location controlled by hackers. Sometime this data exfiltration phase is done directly through installed malicious binaries or a human threat actor can remotely log into the machine through a planted backdoor and upload this information manually. Attackers use protocols of their choice to exfiltrate this data, most common choices are HTTP, HTTPS/TLS/SSL, FTP and the like.

Credential Stealing Attacks are an effective way to snatch someone's confidential information. Hacker's create a look-a-like web page matching different brands' (Google, Yahoo, Microsoft etc.) Sign-in, Sign-up, Password recovery pages etc. and send victim a deceiving email or instant message linking to this fake page. When the victim reads the message, the fake page is displayed for the victim. If the victim doesn't pay close attention to the URL or security certificate of the page, he/she would enter confidential information onto the fake page—resulting in real time transfer of the user's sensitive information to attackers.

Anti-virus software has been available since the late 1990's. More recently, Intrusion Prevention Systems (IPS), Sandbox based Web MPS and Next Generation Firewalls have attempted to add protection against certain types of malware. These devices commonly depend on two detection technologies for detecting malware: signatures and sandboxes. Unfortunately, both of these detection mechanisms are easily circumvented by the current generation of cyber-attacks.

In addition, a variety of malicious activities including cyber attacks can be performed with the help of malicious servers. These malicious servers are online hosts that are set up and controlled by cyber criminals and can be set up to serve malware binaries, exploits, social engineering, and/or credential stealing attacks. Some of these servers can act as mother-ships that malware can use to retrieve commands and to upload stolen data after successfully compromising a machine.

Phishing used to be comprised of easy-to-spot phishing emails attempting to trick users with fake login pages or scams. However, the phishing landscape has changed dramatically over the last few years. Today's threat actors are using new attack vectors across mobile, email, and web to deliver a greater variety of phishing payloads. Moreover, the threats may use multiple evasion tactics and speed to bypass multi-layer defenses. At the same time, phishing payloads are no longer limited to simple scam or fake login phishing sites. New phishing payloads can include a variety of attacks such as Scareware, Rogueware, Malicious Browser Extension, or Money transfer scam.

Mobile and remote workers are at greater risk from phishing threats. Without full-time VPN tunneling, they're outside of perimeter protections, and on mobile, the risks are even higher. Small screens can hide important clues about senders and web page URLs, making it harder to spot phishing threats. Mobile users are also exposed to additional unprotected attack vectors beyond email such as SMS (SMIShing), social media, ads, rogue apps, and more.

Mobile users are also exposed to additional unprotected attack vectors beyond email such as SMS (SMiShing), social media, ads, rogue apps, and more. Built-in safe browsing protections on desktop browsers do not keep pace with newly emerging zero-hour threats. And due to resource constraints, only a fraction of this protection is available on mobile browsers.

Moreover, built-in safe browsing protections on desktop browsers do not keep pace with newly emerging zero-hour threats. And due to resource constraints, only a fraction of this protection is available on mobile browsers.

SUMMARY OF INVENTION

Recognized herein is a need for methods and systems for stopping multi-vector, multi-payload phishing and social engineering attacks that is applicable to all major platform or operating system (OS), particularly mobile platform. It would also be advantageous for such a universal detection method and system to conduct real time inspection of web traffic, and SMS messages in hunt for phishing attacks with deployment flexibility to be seamlessly deployed to mobile iOS, Android, Windows, MAC OSX, Linux and Chrome OS, via integrations with UEM solution (Unified Endpoints Management Solutions), Group Policies or via installation invites sent through Email or Text messages.

The present disclosure provides systems and methods for protecting endpoint users by automatically inspecting web traffic, and SMS messages generated by their devices in real time and for detecting and blocking different types of phishing attacks. In particular, the provided remote endpoint protection methods and systems provide purpose-built, multi-payload anti-phishing solutions across multiple vectors (e.g., email, SMS, social media, messaging apps, games, ads, pop-ups, search, technical scams, SMIShing, etc.). In some cases, the provided remote endpoint protection methods and systems provide phishing site detection technology that protects users from more advanced threats, many of which currently bypass other security controls and "safe browsing" and SMS filtering features. The endpoint protection capability protects users from browsing to phishing sites or viewing a SMS/Text. This beneficially disrupts phishing and social engineering threats near the start of the killchain, reducing the risk of credential theft, rogue software, scareware (e.g., technical scams, fake virus alert, etc.), social engineering scams (e.g., Credit card and Bitcoin fraud, money transfer scams, fake deals, prizes, etc.), phishing callbacks (e.g., data exfiltration, C2 callbacks, etc.), SMIShing, breaches and more.

Moreover, the provided remote endpoint protection methods and systems are flexible in deployment and can be deployed with UEM (Unified Endpoints Management Solutions), Group Policies or offer installation via Email or Text messages-based invites. For example, the provided remote endpoint protection methods and systems may protect end users from multi-vector, multi-payload phishing threats with lightweight, cloud-powered agents that may come in form of native Mobile agent for iOS and Android and browser extensions available for all major desktop browsers like Chrome, FireFox, Safari, Internet Explorer, Microsoft Edge and Opera, etc. Additionally, the remote endpoint protection system provides anti-phishing capabilities with a simple, intuitive user experience, local and cloud-based analytics & reporting.

In one aspect of the disclosure, an endpoint protection system is provided. The system comprises: an endpoint agent deployed to an endpoint device, where the endpoint agent is built into one or more existing applications running on the endpoint device and is configured to detect a phishing attack using a set of machine learning algorithm trained classifiers, block the phishing attack and provide a preview of the blocked phishing attack; and an endpoint management system in remote communication with the endpoint agent, where the endpoint management system is configured to train and develop the set of classifiers.

In some embodiments, the endpoint agent is configured to capture a network session activity between the endpoint device and one or more internet servers and identify a potentially malicious webpage. In some cases, the endpoint agent is configured to further send a request to the endpoint management system for determining whether the potentially malicious webpage is benign or malicious. In some cases, the potentially malicious network flow is further analyzed using a virtual browser technique. For example, the virtual browser technique comprises loading the potentially malicious webpage into a virtual browser memory and extracting forensic intelligence on a behavior of the potentially malicious webpage. In this case, the preview of the blocked phishing attack is generated using artifact from the virtual browser memory.

In some embodiments, the one or more existing applications include a web browser and the endpoint agent is a web browser extension. In some embodiments, the endpoint agent provides a graphical user interface running on the endpoint device allowing an end user to configure one or more protections provided by the endpoint agent. In some cases, the preview is displayed within the graphical user interface. In some embodiments, the endpoint management system is configured to further receive information about the detected phishing attack and an incident report from the endpoint agent.

In a related yet separate aspect, a method for providing endpoint protection is provided. The method comprises: deploying an endpoint agent to an endpoint device, where the endpoint agent is built into one or more existing applications running on the endpoint device; detecting a phishing attack using a set of machine learning algorithm trained classifiers; blocking the phishing attack and providing a safe preview of the blocked phishing attack by the endpoint agent; and training and developing the set of classifiers in an endpoint management system that is in remote communication with the endpoint agent.

In some embodiments, the endpoint agent is configured to capture a network session activity between the endpoint device and one or more internet servers and identify a potentially malicious webpage. In some embodiments, the method further comprises sending a request to the endpoint management system for determining whether the potentially malicious webpage is benign or malicious. In some cases, the method further comprises analyzing the potentially malicious network flow using a virtual browser technique. For example, the virtual browser technique comprises loading the potentially malicious webpage into a virtual browser memory and extracting forensic intelligence on a behavior of the potentially malicious webpage. In this case, the safe preview of the blocked phishing attack is generated using artifact from the virtual browser memory.

In some embodiments, the one or more existing applications include a web browser and the endpoint agent is a web browser extension. In some embodiments, the method further comprises providing, by the endpoint agent, a graphical user interface running on the endpoint device allowing an end user to configure one or more protections provided by the endpoint agent. In some cases, the method s further comprises displaying the preview within the graphical user interface. In some embodiments, the method further comprises receiving, at the endpoint management system, information about the detected phishing attack and an incident report from the endpoint agent.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein), of which:

FIGS. 13-16 show examples of an endpoint agent deployed as a browser extension.

FIGS. 17-27 show examples of user interfaces of management console, in accordance with embodiments of the present disclosure.

DETAILED DESCRIPTION

Figure 1:
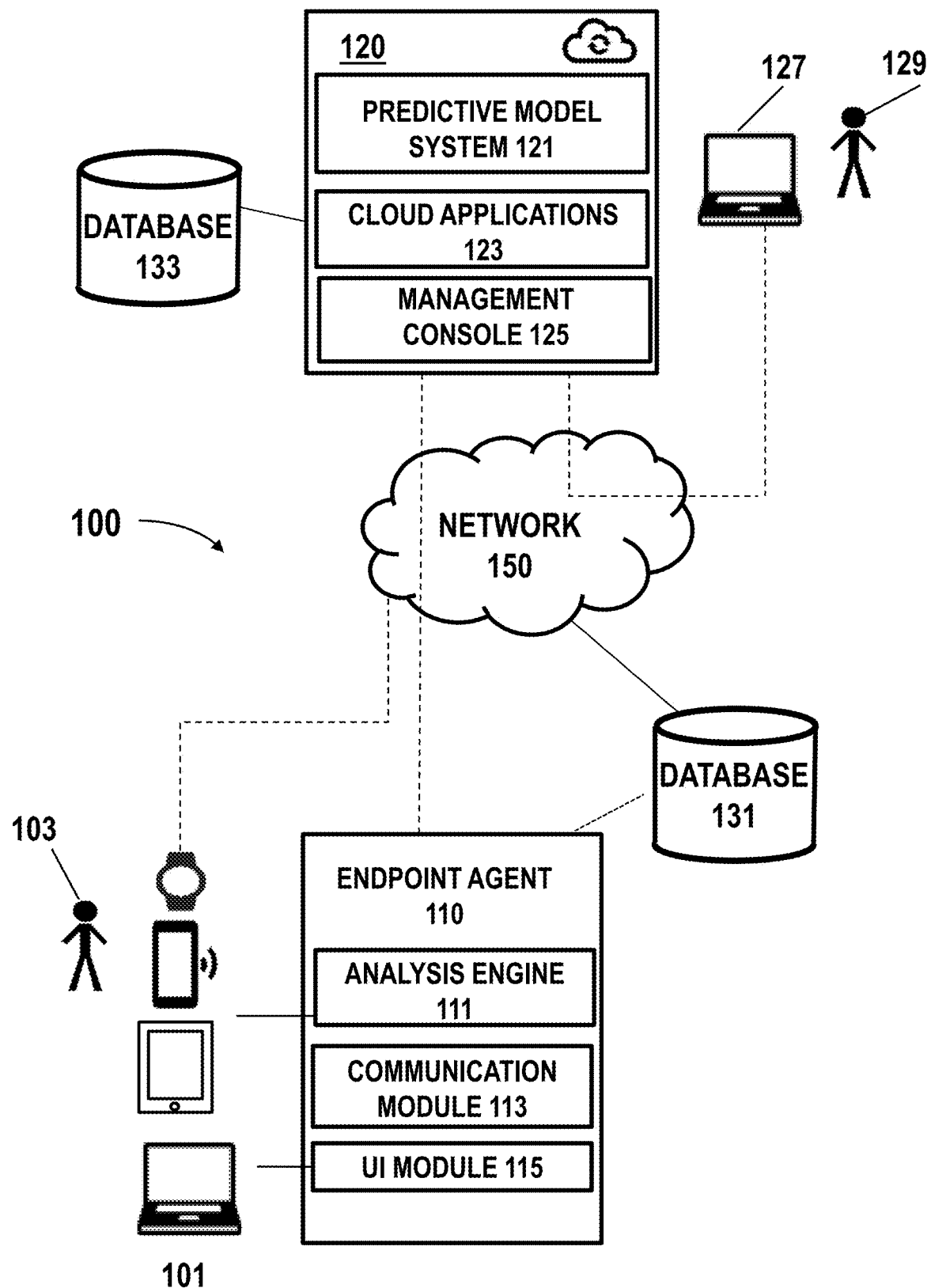
FIG. 1 schematically illustrates a remote endpoint protection system, in accordance with some embodiments.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Systems and methods of the present disclosure may effectively protect remote endpoints devices by automatically inspecting network traffic and SMS messages in real time and detecting and blocking different types of phishing attacks. In particular, the provided remote endpoint protection methods and systems provide anti-phishing solutions that are purpose-built, multi-vector (e.g., email, SMS, social media, messaging apps, games, advertisements, pop-ups, search, technical scams, SMShing, etc.), and multi-payload. In some embodiments, the provided mote endpoint protection methods and systems provide phishing sites and SMS detection technology that protects users from more advanced threats, many of which currently bypass other security controls and "safe browsing" and SMS filtering feature. The endpoint protection capability protects users from browsing to malicious sites and accessing phishing SMS/Text. This beneficially disrupts phishing and social engineering threats near the start of the killchain, reducing the risk of credential theft, phishing exploits, rogue software, scareware (e.g., technical scams, fake virus alert, etc.), social engineering scams (e.g., Credit card and Bitcoin fraud, money transfer scams, fake deals, prizes, etc.), phishing callbacks (e.g., data exfiltration, C2 callbacks, etc.), SMShing, malware infection, and breaches.

In some embodiments, the provided remote endpoint protection methods and systems may comprise a lightweight, cloud-powered mobile agent to protect end users from mobile-centric phishing threats or shield users from phishing sites and SMS/Text. In some cases, the endpoint agent provided by the remote endpoint protection system may be a cloud-powered browser extension stopping phishing sites, rogue popups and malicious browser plugins.

In some embodiments, when the endpoint agent (e.g., mobile application) is deployed to a mobile device, the endpoint agent may inspect mobile device network traffic (e.g., email, SMS/Text, social media, messaging apps, rogue apps, games, mobile browser, pop-up ads, etc.) in real time, the endpoint agent may be capable of detecting different types of phishing attacks such as credential theft (e.g., fake log-in pages, account takeover, etc.), phishing exploits, man-in-the-middle attacks, rogue VPNs and proxies, rogue software application, document theft (e.g., document, IP and media theft, etc.), credit card fraud (e.g., fake deals, loan scams, etc.), money transfer scams (e.g., wire transfers, Bitcoin, gift card scams, etc.), rogue apps (e.g., rogue apps spreading through malvertising), scareware (e.g., technical scams, fake virus alert, etc.), phishing callbacks (e.g., data exfiltration, C2 callbacks, etc.), SMShing, and other mobile-centric attacks as described elsewhere herein. Upon detection of the phishing attacks, the endpoint agent may perform actions such as intercept and/or block the phishing sites, quarantine the SMS/Text message, and/or alert the end user. For example, malicious SMS/text messages or malicious content in the SMS message (e.g., money transfer, link, etc.) may be accurately identified and the malicious SMS message may be quarantined.

The endpoint agent deployed to a mobile device may be a lightweight, native mobile application that has negligible impact on battery consumption, memory usage or mobile device performance. For example, the mobile application may perform edge computing to process at least a portion of the data maintaining close proximity to the endpoint device rather than sending all captured data to a distant centralized cloud. The endpoint agent may perform highly efficient background operations and minimize memory and battery usage. For example, the endpoint agent may launch browsers in a purpose-built remote cloud to dynamically inspect page contents and server behavior using processing techniques such as computer vision, optical character recognition, and natural language processing. With more clues and real-user like interaction dynamics, the provided remote endpoint protection methods and systems may be capable of detecting threats that evade URL inspection and domain reputation analysis methods, identifying and following shortened links, multiple URL re-directs, and detecting phishing pages hosted on compromised websites or legitimate infrastructure.

The endpoint agent can be deployed to any end point devices such as a personal computer (PC), a desktop computer, a mobile computer, a laptop computer, a notebook computer, a tablet computer, a server computer, a handheld computer, a handheld device, a personal digital assistant (PDA) device, a handheld PDA device, a wearable device or IOT devices regardless the type of endpoint device. In some embodiments, the endpoint agent may be deployed to the endpoint devices as browser extension that shields users from live phishing attacks. The endpoint agent may be cloud-powered, lightweight browser extensions that are available for a variety of desktop browsers, protecting Windows, Mac, Chrome OS, and Linux users from phishing attack and rogue browser extensions regardless of which attack vector is used (e.g., email, ads, pop-ups, social media, search, messaging apps, rogue software, etc.). For instance, the endpoint agent (e.g., browser extension) may block phishing sites in real-time, protect users from the dangerous phishing threats such as those that evade multi-layer enterprise defenses and trick cyber-trained users to click a link. For example, the endpoint agent may provide protection against malicious browser extensions such as rogue browser extensions which are promoted through malvertising on legitimate sites, often perform as advertised, serve as stealthy keyloggers, screen scrapers, 2FA interceptors, and the like that can evade detection by next-generation antivirus (NGAV) and Endpoint detection and response (EDR) systems. The endpoint agent may detect such malicious browser extensions by accessing to sites promoting the rogue browser extensions thereby protecting users from compromising their browsers with malicious code. In another example, the endpoint agent is capable of handling encryption challenges in the network-based defense (e.g., TLS 1.3, DNS over HTTPs) raised by the user privacy requirement.

The provided endpoint agent may effectively operate within browser memory and blocks URLs pre-encryption thereby protecting users from web attacks that may not be effectively defended using the traditional man-in-the middle and DNS interception. The endpoint agent is a native, built-in browser extension that can fetch artifacts from browser memory rather than extracting them directly from the networks session so as to avoid encryption, obfuscation, and encoding. The endpoint agent may inform or notify users of detected or blocked threats in an intuitive and safe manner. For example, users who attempt to browse to a malicious site may be blocked and receive an informative warning page allowing them to access a Safe Preview screen shot of the blocked page along with useful information about the threat. In an example, when a user opens a web browser with the built-in extension, the open browser instance loads the extension and the extension is activated to inspect, parse a given network session using different packet inspection techniques, extract artifacts and protocol features, and perform various other functionalities via the extension manifest or background/content script.

The provided remote endpoint protection methods and systems are flexible in deployment and compatible with existing security tools (e.g., endpoint AV solutions, third-party enterprise MDM and EMM solutions). For example, the provided remote endpoint protection methods and systems can be easily deployed and managed via existing UEM solutions, or integrated with existing single sign-on solutions for convenient user provisioning and management.

In some embodiments of the present disclosure, the endpoint agent may be capable of providing the phishing protection without accessing or storing personally identifiable information thereby allowing for improved user privacy protection. For instance, the network and SMS traffic is intercepted and analyzed locally by the endpoint agent as described above without leaving a mobile device or the browser, so the personally identifiable information and user privacy remain safe. Alternatively or in addition to, out-of-band virtual browser analysis may be performed in the cloud by scanning the suspicious URLs in response to a real-time scanning request.

Moreover, the remote endpoint protection system provides anti-phishing capabilities with a simple, intuitive user experience. The remote endpoint protection system may provide a cloud-based endpoint management system (CMS), making it simple to deploy and manage phishing protection (e.g., browser phishing protection or mobile phishing protection) across various types of users and endpoint devices. The endpoint management system may allow administrators to receive real-time phishing incident alerts or reports via email or other notification channel, and a summary report (e.g., hourly, daily, weekly, etc.) of threats/incidents. An endpoint management system may also permit administrator to manage groups, policies, users, and licenses. For example, users and groups can be easily created, assigned, invited, and provisioned manually or directly imported through a CSV file or a remote active directory service. The endpoints system also offers a variety of analytics around phishing incident. Moreover, CMS offers integration point for a variety of Security Information and Event Management (SIEM) systems via APIs.

FIG. 1 schematically illustrates a remote endpoint protection system 100, in accordance with some embodiments. The remote endpoint protection system 100 may provide protections against cyber attacks (e.g., anti-phishing) to endpoint individuals 103 and/or endpoint devices 101. The remote endpoint protection system 100 may comprise endpoint agents 110 deployed to the endpoint devices 101 and a cloud endpoint management system 120. The endpoint agents 110 may be built-in agents such as browser extension or mobile application for processing data collected from the endpoint devices, providing real-time feedback and protection to an individual 103. The endpoint management system 120 may provide users (e.g., administrators) 129 with real-time phishing incident alerts, summary report, analytics or capability of managing the endpoint agents, endpoint devices (e.g., groups, policies, clients, and licenses) via cloud applications 123 and management console 125. For instance, administrators 129 may receive real-time phishing incident alerts via email or other notification channel, or receive a summary report (e.g., hourly, daily, weekly, etc.), manage the endpoint agents, or pull data in SIEM applications, endpoint devices (e.g., groups, policies, clients, and licenses) via a user device (e.g., administrator's device) 127.

In some embodiments, the remote endpoint protection system 100 may employ an edge intelligence paradigm that data processing and prediction/inference is performed at the edge or endpoint device 101 while the predictive models may be built, developed and trained on the backend predictive model system 121 residing on a cloud/data center. For example, local data processing such as protocol analysis and active analysis may be performed on the endpoint user device 101 or trained classifiers/predictive models may run on the endpoint user device 101 (e.g., mobile application, browser extension, hardware accelerator) for inference. For instance, network traffic data may be captured and analyzed by the endpoint agent 110 running on the endpoint device 101 in real-time for anti-phishing protection, whereas an incident report or a message package comprising batch data may be sent to the management console or the cloud at a lower frequency or upon detection of an incident.

Alternatively or in addition to, data processing and analysis may be performed on the cloud while the endpoint agent may download the real-time domain/urls streaming data and IP blacklist feed from the cloud for blacklist matching analysis. For instance, the endpoint agent may include a high-speed engine configured to compare device SMS and Web data against the cloud blacklist feed. If there is a match, malicious traffic may be blocked, and a warning alert can be generated. If no match is detected, the engine may let the traffic (e.g., SMS, web data) route to the original destination. In some cases, the blacklist matching analysis may be performed on the edge/endpoint device. Some of the cloud algorithms that analyze webpage in the cloud may be ported to endpoint device to analyze the locally rendered page and on the fly using machine learning algorithm trained model without a need for Url blacklist match or sending any data to the cloud. In some cases, the machine learning model can be installed on the local mobile device to analyze text messages like sender's phone number, body of the text and links within the text body to detect and quarantine phishing SMS without a need for Url blacklist match or sending any data to the cloud. In some cases, the endpoint agent may perform real-time URL scanning. If there is no match within the blacklist, the endpoint agent may determine if the traffic is suspicious through protocol analysis. If the traffic is determined to be suspicious, the endpoint may send an out-of-bound URL scanning request to the cloud. The cloud may analyze the candidate webpage using Virtual Browser technology in the cloud. The cloud may send a signal to the endpoint agent about whether the webpage or the URL is malicious or not. If it is malicious, a warning alert may be generated for the end user.

The provided endpoint agent may be capable of performing real-time Url scanning and on-device machine learning analysis on content delivered through various channels such as social media channel and messenger APIs (application programming interfaces) such as Facebook channel, Twilio SMS channel, Skype channel, Slack channel, iMessage channel, WeChat channel, Telegram channel, Viber channel, Line channel, Microsoft Team channel, Cisco Spark channel, and Amazon Chime channel, and various others.

In some embodiments, the endpoint agent 110 deployed to the endpoint device (e.g., personal computer (PC), desktop computer, mobile computer, laptop computer, notebook computer, tablet computer, server computer, handheld computer, handheld device, personal digital assistant (PDA) device, a handheld PDA device, a wearable device, etc.), may be lightweight, native mobile application or a browser extension that has negligible impact on battery consumption, memory usage, mobile device performance or user experience. For example, the endpoint agent may perform edge computing to process at least a portion of the data maintaining close proximity to the endpoint device rather than sending all captured data to the distant centralized cloud 120. The endpoint agent may perform highly efficient background operations to minimize memory and battery usage.

In some embodiments, the endpoint agent 110 may comprise an analysis engine 111, a communication module 113, and a user interface module 115. The analysis engine 111 may be capable of detecting threats that evade URL inspection and domain reputation analysis methods, identifying and following shortened links, multiple URL re-directs, detecting phishing pages hosted on compromised websites or legitimate infrastructure, and blocking various types of network-based cyber attacks as described above. In some cases, at least a portion of the data processing is performed by the analysis engine locally at the endpoint device and a portion of the data processing is performed at a remote cloud. For example, the analysis engine 111 may process the captured network traffic data such as inspecting and parsing a given network session using different packet inspection techniques, extracting artifacts and protocol features, and launching browsers in a purpose-built remote cloud (e.g., cloud 120) to dynamically inspect page contents and server behavior using processing techniques such as computer vision, optical character recognition, and natural language processing. Such network-based cyber attack analysis methods include those described in U.S. patent Ser. No. 10/404,723 entitled "Method and system for detecting credential stealing attacks" which is incorporated by reference herein in the entirety. Details about the endpoint agent and the various components are described later herein.

An individual 103 (e.g., user) may be any end users protected from network-based cyber-attacks by the provided remote endpoint protection system. In some cases, the end users 103 may be mobile and remote individuals are at greater risk from phishing threats. For instance, without full-time VPN tunneling, they're outside of perimeter protections, and on mobile, the risks are even higher. Small screens can hide important clues about senders and web page URLs, making it harder to spot phishing threats. Mobile users are also exposed to additional unprotected attack vectors beyond email such as SMS (SMIShing), social media, ads, rogue apps, and various others. A user may be protected by the remote endpoint protection system from multiple attack vectors such as email, ads, pop-ups, social media, search, messaging apps, rogue software, regardless of the operations system or platform (e.g., Windows, Mac, Chrome OS, and Linux users). For instance, the endpoint agent (e.g., browser extension) may block phishing sites in real-time, protect users from the dangerous phishing threats such as those that evade multi-layer enterprise defenses and trick cyber-trained users to click a link. For example, the endpoint agent may provide protection against malicious browser extensions such as rogue browser extensions which are promoted through malvertising on legitimate sites, often perform as advertised, serve as stealthy keyloggers, screen scrapers, 2FA interceptors, and the like that can evade detection by NGAV and EDR systems. In another example, users who attempt to browse to a malicious site may be blocked and receive an informative warning page allowing them to access a Safe Preview screen shot of the blocked page along with useful information about the threat. The users 103 may also be able to access information related to threats and cyber-attacks detected and blocked by the endpoint agent, manage the endpoint agent, review reports via an endpoint user interface provided by the user interface module 115 and/or the backend endpoint management system 120.

The user interface (UI) module 115 may allow users to review real-time phishing attacks, incident reports, educational warning page showing details on phishing threat and a safe preview of a detected attack, real-time notification and daily incident report summaries and various others. The user interface module 115 may deliver information and content to be displayed on the endpoint device 101 related to the cyber attacks, for example, by way of one or more web pages or pages/views of a mobile application. The user interface module may provide a graphical user interface (GUI) that can be integrated into other applications, or via any suitable communication channels (e.g., email, Slack, SMS) for delivering notifications. A user may provide user input via the GUI such as to view detailed information about a detected/blocked threat, preview a detected phishing attack, test an alert setting, set up protections on the endpoint device, receive real-time notification and daily incident report summaries and various others.

A user may be associated with one or more endpoint devices or user devices 101. The endpoint agent can be deployed to any type of endpoint devices 101 such as a personal computer (PC), a desktop computer, a mobile computer, a laptop computer, a notebook computer, a tablet computer, a server computer, a handheld computer, a handheld device, a personal digital assistant (PDA) device, a handheld PDA device, a wearable device or IOT devices. In some embodiments, the endpoint agent may be deployed to the endpoint devices as browser extension that shields users from live phishing sites. Examples of user devices may include, but are not limited to, mobile devices, smartphones/cellphones, tablets, personal digital assistants (PDAs), laptop or notebook computers, desktop computers, media content players, virtual reality systems, augmented reality systems, wearable device or microphones. The user device may be any electronic device capable of analyzing, receiving user input data (e.g., receiving user input for an incident report or emergency alert, user input to complete a smart form, etc.), providing or displaying certain types of feedback data (e.g., adverse event statistics, alert, behavior change cue, etc.) to a user.

The remote endpoint protection system 100 may comprise a plurality of built-in endpoint agents in communication with a backend endpoint management system 120. The endpoint management system 120 may comprise one or more servers and one or more database systems 133 which may be configured for storing or retrieving relevant data. Relevant data may comprise the telemetry data provided by endpoint agents (e.g., incident report, extracted protocol features, real-time active features, destination the application is trying to reach, the port number, layer-7 information such as http headers, URL, RPC/REST-api endpoint, topics, or application signatures, metadata such as user) and various other data as described elsewhere herein. In some instances, the endpoint management system may receive data from the database systems 133, 131 which are in communication with the one or more external systems.

The endpoint management system 120 may include services or applications that run in the cloud or an on-premises environment to remotely configure and manage the endpoint agent 110. This environment may run in one or more public clouds (e.g., Amazon Web Services (AWS), Azure, etc.), and/or in hybrid cloud configurations where one or more parts of the system run in a private cloud and other parts in one or more public clouds. In some embodiments, the endpoint management system may comprise a predictive model system 121 configured to train and develop predictive models, one or more cloud applications 123 to process malicious candidates or reports transmitted from the endpoint agent, and a management console 125 to direct and coordinate the movement of information through databases (e.g. a central database) 133, 131 and endpoint agents, generate notification and the like. The endpoint management system 120 may employ any suitable technologies such as container and/or micro-service. For example, the cloud applications and/or the predictive model system may provide cloud analytics backed by micro-services. It is noted that although the endpoint management system is shown as a component of the data center, the endpoint management system can be a standalone system.

In some embodiments, the predictive model system 121 may comprise a model creator and a model manager. In some cases, a model creator may be configured to train, develop or test a predictive model using data from a cloud data lake (e.g., database 133). The model manager may be configured to manage data flows among the various components (e.g., cloud data lake 133, 131, local database, edge computing system, endpoint agent 110, endpoint device 101, model creator), provide precise, complex and fast queries (e.g., model query), model deployment, maintenance, monitoring, model update, model versioning, model sharing, and various others. For example, the deployment context may be different depending on the endpoint software stacks (e.g., types of network communications, applications onboard the edge infrastructure, user information, etc.) and the model manager may take into account the application manifest such as edge hardware specifications, deployment location, information about compatible systems, data-access manifest for security and privacy, emulators for modeling data fields unavailable in a given deployment and version management during model deployment and maintenance. The predictive model system 121 may also support ingesting data transmitted from the endpoint agent 110 into one or more databases or cloud storages 133, 131. The predictive model system 121 may include applications that allow for integrated administration and management, including monitoring or storing of data in the cloud or at a private data center.

The management console 125 may provide a management user interface (e.g., portal, administrator console, management user interface, etc.) to display or present information to a user or system administrator 129 through a user device 127. For instance, the management user interface provides users (e.g., administrators) 129 real-time phishing incident alerts, summary report, or portal to manage the endpoint agents, endpoint devices (e.g., groups, policies, clients, and licenses), users, history of threats and incidents. A user or system administrator can login to the portal or access the portal by entering a user name and password. In some instances, login can require two factor authentication, wherein the user must authenticate by providing a password that was supplied through other means e.g. by a dongle, via text to a mobile device or through an external application running on a mobile device.

In some embodiments, the management console 125 may comprise a management user interface (UI) module for viewing analytics, real-time phishing incident alerts, summary report, or for developing and deploying analytics expressions, deploying endpoint agents (e.g., mobile applications) to the endpoint devices, monitoring predictive model performance, and configuring a predictive model.

In some cases, management user interface may include a graphical user interface (GUI) provided on a display of the user device 127. The display may or may not be a touchscreen. The display may be a light-emitting diode (LED) screen, organic light-emitting diode (OLED) screen, liquid crystal display (LCD) screen, plasma screen, or any other type of screen. The display may be configured to show a user interface (UI) or a graphical user interface (GUI) rendered through a cloud application (e.g., via an application programming interface (API) executed on the administrator's user device 127).

In some embodiments, the endpoint management system 120 may be implemented on a server. A server may include a web server, a mobile application server, an enterprise server, or any other type of computer server, and can be computer programmed to accept requests (e.g., HTTP, or other protocols that can initiate data transmission) from a computing device (e.g., user device, other servers) and to serve the computing device with requested data. A server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In addition, a server can be a broadcasting facility, such as free-to-air, cable, satellite, and other broadcasting facility, for distributing data. A server may also be a server in a data network (e.g., a cloud/fog computing network).

A server may include various computing components, such as one or more processors, one or more memory devices storing software instructions executed by the processor(s), and data. A server can have one or more processors and at least one memory for storing program instructions. The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the methods can be implemented in hardware components or combinations of hardware and software such as, for example, ASICs, special purpose computers, or general purpose computers.

The user device 127 can be the any type of devices allowing the administrators to access the management console or the cloud applications as described above. For instance, administrators 129 may receive real-time phishing incident alerts via email or other notification channel, or receive a summary report (e.g., hourly, daily, weekly, etc.), manage the endpoint agents, endpoint devices (e.g., groups, policies, clients, and licenses) via the user device 127.

The cloud database 133 may comprise storage containing a variety of data consistent with disclosed embodiments. For instance, the databases may store, for example, selected real-time data transmitted from the endpoint agents, data about a predictive model (e.g., parameters, hyper-parameters, model architecture, training dataset, performance metrics, threshold, rules, etc), data generated by a predictive model (e.g., intermediary results, output of a model, latent features, input and output of a component of the model system, etc.), incident report, record, algorithms, and the like. Such database may include those databases, data lakes described in U.S. Application. Ser. No. 15/878,792 entitled "Method And System For Protection Against Network-Based Cyber Threats." For example, the database 133 may comprise a content database that maintains up to date information about recently seen threats (e.g., Threat Name, Threat Description, Alias, Infection Vectors), information about known hacker groups (e.g., Hacker Group Name, Country of Origin, Expertise, Common Targets, Alias etc.). In certain embodiments, one or more of the databases may be co-located with the server 120, may be co-located with one another on the network, or may be located separately from other devices. One of ordinary skill will recognize that the disclosed embodiments are not limited to the configuration and/or arrangement of the database(s).

Each of the components (e.g., servers, database systems, computer devices, external systems, and the like) may be operatively connected to one another via one or more networks 150 or any type of communication links that allows transmission of data from one component to another. For example, the respective hardware components may comprise network adaptors allowing unidirectional and/or bidirectional communication with one or more networks. For instance, the servers and database systems may be in communication—via the one or more networks 150—with the endpoint devices, and/or data sources to transmit and/or receive the relevant data.

Various communication protocols may be used to facilitate communication between the endpoint agents 110, endpoint device 101, user device 127, the cloud or remote endpoint management system, databases 133, 131 and other components of the system. These communication protocols may include VLAN, MPLS, TCP/IP, Tunneling, HTTP protocols, wireless application protocol (WAP), vendor-specific protocols, customized protocols, and others. While in one embodiment, the communication network is the Internet, in other embodiments, the communication network may be any suitable communication network including a local area network (LAN), a wide area network (WAN), a wireless network, an intranet, a private network, a public network, a switched network, and combinations of these, and the like. The network may comprise any combination of local area and/or wide area networks using both wireless and/or wired communication systems. For example, the network may include the Internet, as well as mobile telephone networks. In one embodiment, the network uses standard communications technologies and/or protocols. Hence, the network may include links using technologies such as Ethernet, 802.11, worldwide interoperability for microwave access (WiMAX), 2G/3G/4G or Long Term Evolution (LTE) mobile communications protocols, Infra-Red (IR) communication technologies, and/or Wi-Fi, and may be wireless, wired, asynchronous transfer mode (ATM), InfiniBand, PCI Express Advanced Switching, or a combination thereof. Other networking protocols used on the network can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), and the like. The data exchanged over the network can be represented using technologies and/or formats including image data in binary form (e.g., Portable Networks Graphics (PNG)), the hypertext markup language (HTML), the extensible markup language (XML), etc. In addition, all or some of links can be encrypted using conventional encryption technologies such as secure sockets layers (SSL), transport layer security (TLS), Internet Protocol security (IPsec), etc. In another embodiment, the entities on the network can use custom and/or dedicated data communications technologies instead of, or in addition to, the ones described above. The network may be wireless, wired, or a combination thereof.

In an example of a deployment scenario, the remote endpoint protection system 100 can be a multi-tenant aware providing afore-mentioned services to multiple tenants simultaneously while providing secure isolation of information related to user data and telemetry data among the multiple tenants. For instance, the remote endpoint protection system 100 may include services or applications (e.g., incident management, model creation and management, management console or administrator portal, etc.) that run in the cloud or on-premises environment and endpoint agents (e.g., mobile application, browser extension) deployed to the endpoint devices to detect and identify potentially malicious traffic session, capture real-time intelligence and extract features from the real-time intelligence. In some cases, the remote endpoint protection system may comprise a software-based solution based on fog computing concepts which extends some of the tasks performed by the endpoint agents closer to the edge (e.g., endpoint devices). Maintaining close proximity to the edge (e.g., mobile devices, workloads, virtual machines, data centers, etc.) may significantly reduce overall bandwidth requirements and the cost of managing widely distributed networks. The provided remote endpoint protection system may employ fog computing paradigm that at least a portion of secure tasks can be performed at the edge. For example, tasks performed by a fog layer between the cloud/SaaS and the endpoint agent may include, but not limited to, predictive model management, behavior analysis of target server, proxying of traffic out of demilitarized zone, co-resident with existing firewall, manage or update the endpoint agent, and various others as described elsewhere herein. Alternatively, one or more of the aforementioned tasks can be performed by the management console of the endpoint management system running in the cloud (e.g., cloud application).

Figure 2:
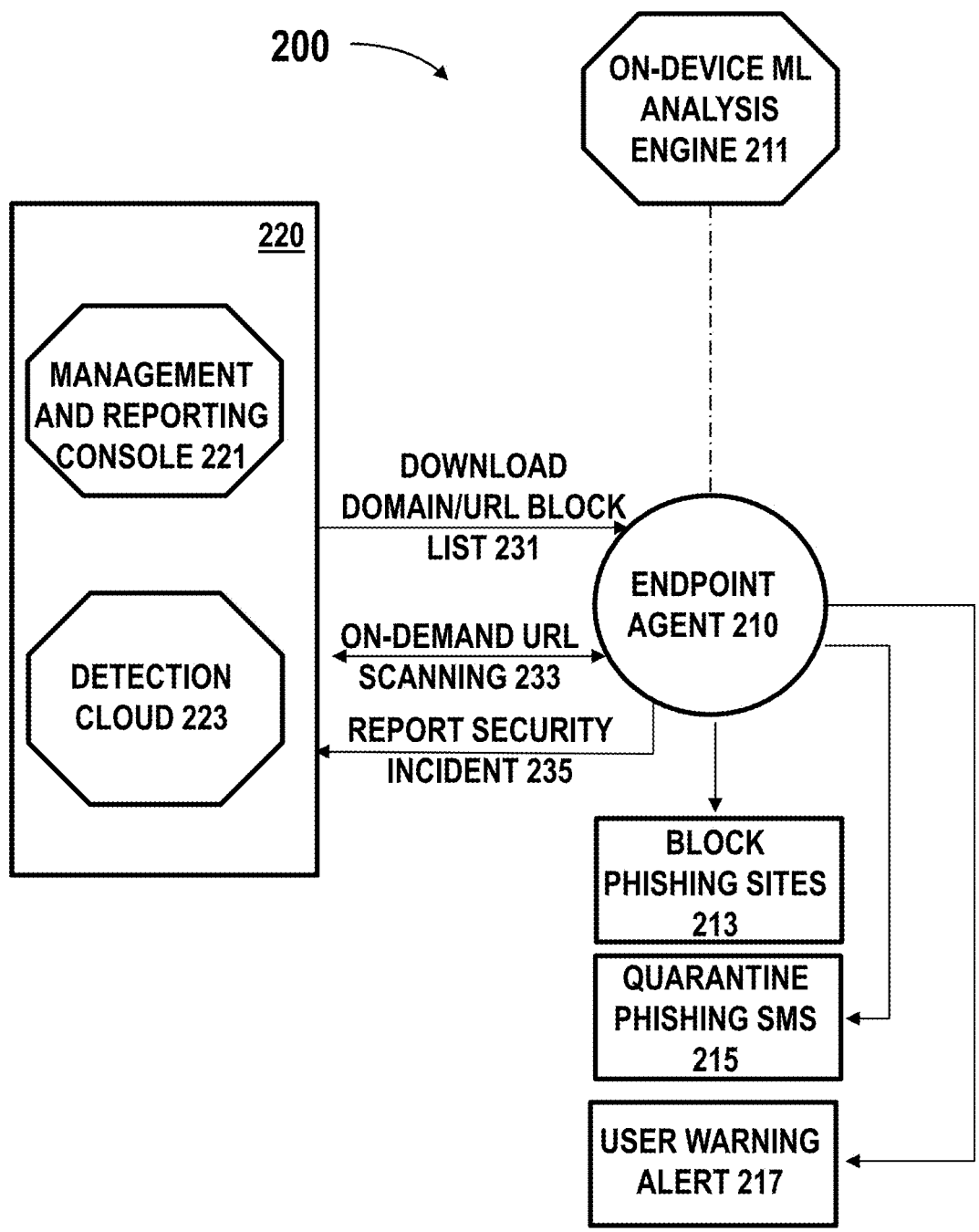
FIG. 2 schematically illustrates data flows between the endpoint agents and the backend endpoint management system, in accordance with some embodiments.

FIG. 2 schematically illustrates data flows within a remote endpoint protection platform 200 such as between the endpoint agents 210 and the backend endpoint management system 220, in accordance with some embodiments. The remote endpoint protection platform 200 may include the endpoint agent 210 deployed to an endpoint device and an endpoint management system 220 residing on a remote cloud in communication with the endpoint agent and/or the endpoint device. In some cases, at least a portion of the data processing is performed locally at the endpoint device and a portion of the data processing is performed at a remote cloud. The endpoint management system may comprise a management and reporting console 221 and a detection cloud 223 powered by virtual browsers serving feed and capabilities of handling on-demand URL scanning. The endpoint agent 210 and/or the detection cloud may process the captured network traffic data (e.g., SMS, web data) such as inspecting and parsing a given network session using different packet inspection techniques, extracting artifacts and protocol features, and launching browsers in the detection cloud to dynamically inspect page contents and server behavior using processing techniques such as computer vision, optical character recognition, and natural language processing.

The endpoint agent 210 may be built-in agents such as browser extension or mobile application for processing captured SMS, network flow data (e.g., capture network session activity between the endpoint device and one or more internet servers and to extract a network flow from the network session activity) and providing real-time feedback (e.g., warning page or notification) and protection (e.g., blocking a threat, quarantine a message, etc.) to end users. The endpoint agent can be the same as the endpoint agent as described in FIG. 1. In some embodiments, the endpoint agent 210 may comprise a communication module, a user interface module, and an optional on-device analysis engine 211.

In some cases, the endpoint agent 210 and the detection cloud 223 may perform real-time URL scanning. For instance, the endpoint agent may download the intelligence data such as domain/url block list 231 (e.g., real-time domain streaming data and IP blacklist feed) from the cloud for blacklist matching analysis. For example, the endpoint agent 210 may include a high-speed engine configured to compare device SMS and Web data against the cloud blacklist feed. If there is a match, malicious traffic may be blocked (e.g., block phishing sites 213 or quarantine phishing SMS 215), and a warning alert may be generated 217.

In some cases, if there is no match but the traffic is determined to be potentially suspicious, the endpoint may send an out-of-bound URL scanning request to the cloud 233. The request may include the URL to be further analyzed. The detection cloud 223 may analyze the candidate webpage in response to the request, and send a signal to the endpoint agent about whether the webpage or the server is malicious or not. In some cases, if the webpage/server is determined to be malicious, a warning alert may be generated for the end user 217.

The detection cloud 223 may use any suitable techniques to determine whether the traffic is malicious. For instance, Virtual Browser technology may be used to investigate a server employing evasion techniques. The detection cloud may mimic as a normal client to interact with the candidate webpage, collect forensics intelligence during the interaction and analyze the forensics intelligence to determine the candidate webpage as benign or malicious. The candidate webpage may be loaded into a browser memory for further examination. Extracting these artifacts from the browser memory instead of fetching it directly from the web server may avoid opportunities for encryption, obfuscation and encoding. For example, an invisible browser window may be launched in the cloud and subsequently, the URL of the candidate page may be opened inside the browser and the brand page may be loaded, rendered, and stored in the browser memory.

The detection cloud 223 may load the candidate webpage to a virtual browser memory, interact with the candidate webpage and collect the forensics intelligence on the candidate webpage behavior. As described above, a malicious sever may perform different types of evasion techniques to avoid detection. For example, a malicious server may present a variety of challenge—response type of tests such as image challenge, text challenge, audio challenge, or random popups/dialogues on the screen before showing the actual content or actual phishing page. The detection cloud may interact with the probed server by responding to the challenge—response tests with aid of virtual keyboard and/or virtual mouse. For example, the detection cloud may interact with the browser through keyboard and mouse simulation APIs. Browsers usually offer Web Drivers that allow interaction with browser software through APIs to simulate keyboard input and mouse movement. Using keyboard and mouse simulation APIs, a browser can accept input as if it's coming from a hardware based keyboard or mouse.

Forensics intelligence on the candidate webpage behavior may be collected during the interaction by the detection cloud 223. For example, a credential stealing page may accept dummy credentials since it does not have the correct credential. In another example, after the detection cloud responding to the challenge test, the candidate webpage may expose the actual phishing page. The intelligence collected during the interaction along with data extracted from the artifacts may be analyzed and used to determine whether the candidate page is malicious or benign. For example, the intelligence and the artifacts may be supplied to a machine learning trained model as input data and the output may indicate whether the candidate page is malicious or benign. The result may then be returned to the endpoint agent 210 to trigger an alert if the webpage is malicious.

The artifacts extracted by the virtual browser technique may be utilized by the endpoint agent to provide a safe review feature. In some embodiments of the present disclosure, the safe preview feature may allow endpoint users to view the blocked threats (e.g., webpage) in a convenient manner. A safe preview of a phishing site can be accessible to the end user a via multiple channels such as on the warning page, on a threat detail page, email admin alert (e.g., a screenshot of the phishing site in the email body), text message, and the user interface of the cloud-based management system. The safe preview may include at least a thumbnail image or screenshot of the phishing site that is browsed from the virtual browser as described above along with details about the threat. A user may share (e.g., download or share) the safe preview of the blocked page with other users to warn them and for training purpose.

The screenshot of the phishing site may be provided by the cloud-based technology such as the virtual browsers techniques. As described above, the virtual browser techniques may analyze the behavior and content of a suspected Url. Artifacts such as screenshot, text, and HTML are extracted from the rendered page to detect the presence of a phishing attack. In some cases, when the endpoint agent blocks a Url, the endpoint agent may request the management cloud for a copy of the screenshot that it had stored at the time of detection so that the screenshot may be presented to the endpoint user on the endpoint warning alerts or as a preview of the phishing site. At the same time, management could may send the same screenshot as part of the admin Email Notification and displays on the management dashboard.

The detection cloud 223 may be capable of detecting various types of threats such as threats that evade URL inspection and domain reputation analysis methods, identifying and following shortened links, multiple URL redirects, and detecting phishing pages hosted on compromised websites or legitimate infrastructure, blocking various types of network-based cyber-attacks as described elsewhere herein. Such network-based cyber attack analysis backend methods and analysis engine can include those described in U.S. application. Ser. No. 15/878,792 entitled "Method And System For Protection Against Network-Based Cyber Threats," which is incorporated by reference herein in the entirety.

For example, the backend network-based cyber attack analysis method and system can comprise a cyber attacks protection framework designed specifically to stop a variety of cyber threats like Drive-by Exploits, Malicious Binaries, Data Exfiltration, Social Engineering and Credential Stealing attacks. The system can inspect network traffic in real-time and analyzes it with a series of filtrations, machine learning classification and an attribution process to pin-point and stop a series of malicious activities going within a network.

Once malicious activity is detected, the system can use different mechanisms to block this communication, hence making the attackers attempts to infiltrate the network unsuccessful. Additionally, the system may log all the recorded malicious activity along with digital evidence and identification of the victim machine as an incident. The incident data may further be consumed by network administrators and incident response teams through a variety of built-in user interfaces like Web, CLI (Command Line Interface) and software application for record keeping and postmortem analysis.

In some embodiments of the present disclosure, at least a portion of the analysis performed by the detection cloud is ported to the on-device machine learning analysis engine 211. The on-device machine learning analysis engine 211 may be part of the endpoint agent and deployed to the endpoint device. For example, the device machine learning analysis engine 211 may include a series of machines learning trained classifiers for analyzing the content of the website being browsed by the end user by dynamically inspecting page contents and server behavior using processing techniques such as computer vision, optical character recognition, and natural language processing (NLP) as described above. In this method, the endpoint agent may hook into the endpoint device browser memory and wait for the user to click a link or browse to a website. One the website is rendered, the endpoint agent may extract text, HTML, image and Url from the local browser memory to extract machine learning features that can be further fed to a local machine learning engine to detect presence of a phishing page.

In some embodiments of the present disclosure, at least a portion of the analysis performed by the detection cloud is ported to the on-device machine learning analysis engine 211. The on-device machine learning analysis engine 211 may be part of the endpoint agent and deployed to the endpoint device. For example, the device machine learning analysis engine 211 may include a series of machines learning algorithm trained classifiers for analyzing the content of the incoming SMS message or similar messaging services using natural language processing techniques and sender reputation checks. In this method, the endpoint agent may hook into endpoint device messaging apps memory and wait for a message to come. Once the message is received, the endpoint agent may extract sender's information, message body and link within message body to extract machine learning features via NLP techniques that can further be fed to a local machine learning engine to detect presence of a phishing text. Once system detects a phishing message it can take appropriate actions such as quarantining or blocking the message along with warning alerts. The system may also use an English translation engine to convert non-English text messages into English before extracting NLP related features and performing the classifications.

In some cases, the series of machine learning classifiers may be unlike conventional machines learning which are based on supervised learning. The machine learning classifiers may be trained using unsupervised learning or self learn from its experience and past decision and become incrementally more accurate both in terms of precision and recall. The on-device machine learning analysis engine 211 can detect and stop malicious activities using multiple types of standard and custom protocols like HTTP, HTTPS/TLS/SSL, DNS, or the protocols used to deliver SMS and instant messages.

In some cases, the on-device machine learning analysis engine 211 may comprise an analysis engine for identifying potentially suspicious or potentially malicious network traffic/flow. The on-device machine learning (ML) analysis engine may operate locally on the endpoint device without communicating with the cloud. The potentially suspicious network traffic can be identified using the machine learning techniques as described above.

In some cases, upon detection of potentially suspicious network traffic or potentially suspicious malicious network flow, the endpoint agent 210 may pass it on to an active analysis engine residing on the cloud 220 to further determine whether the potentially malicious flow is malicious or benign based on active features collected in real-time. The determination may be generated using a set of classifiers different from the set of classifiers for identifying the potentially malicious flow. The active features may include, for example, intelligence about behavior of the potentially suspicious server/candidate when interacting with the detection cloud. Details about the active analysis is described later herein. The endpoint agent, on-device machine learning analysis engine or the detection cloud 223 may individually or collectively implement an analysis framework that performs real-time inspection of SMS and traffic of the endpoint device and provide protections from the detected threats (e.g., block phishing sites 213, quarantine phishing SMS 215, generate user warning alert 217).

Figure 3:
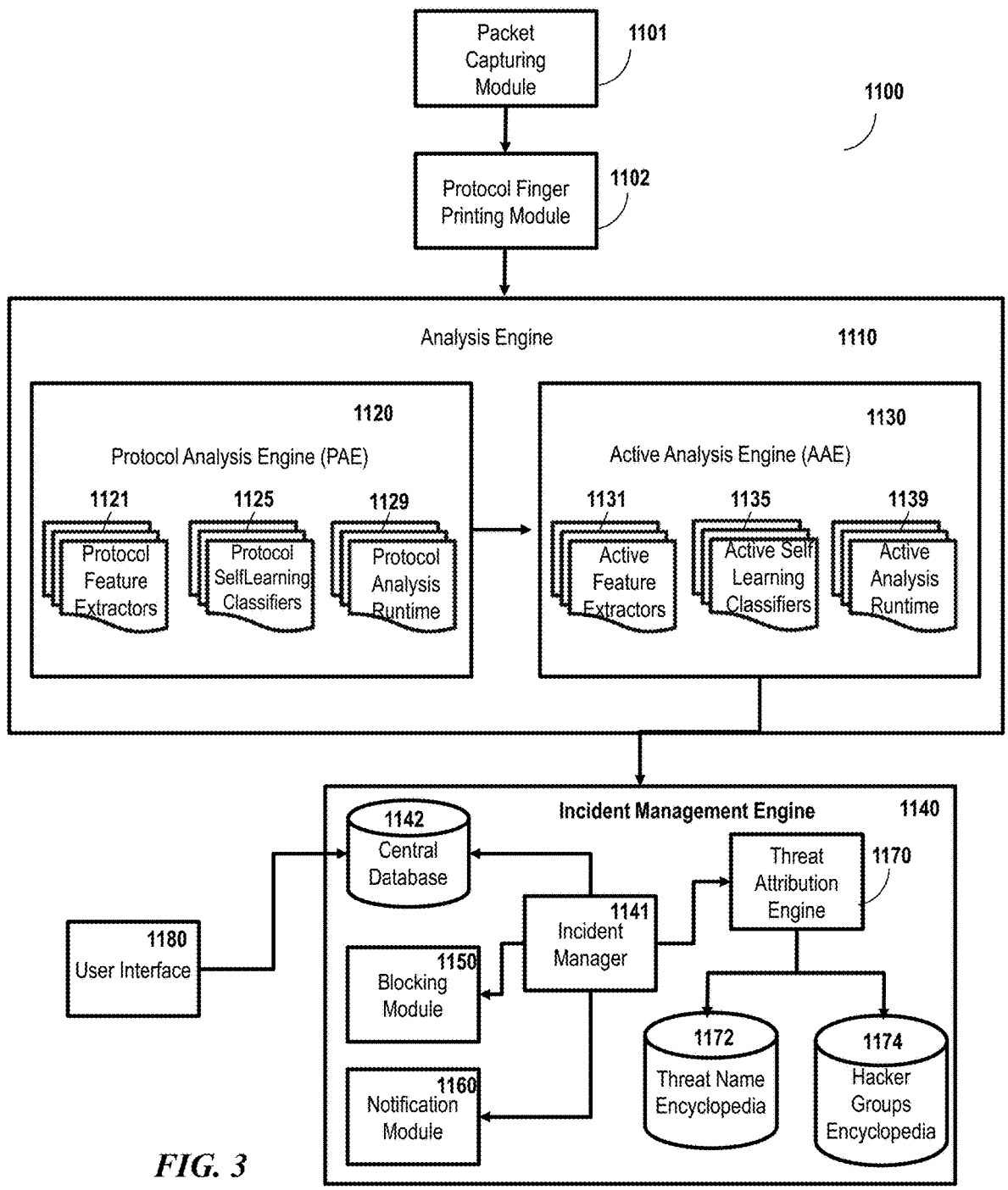
FIG. 3 shows certain elements of the active analysis engine (AAE) for an exemplary system and method.

FIG. 3 schematically shows an example of a real-time analysis framework or analysis engine 1110 including a plurality of functional elements, in accordance with some embodiments. The analysis engine may perform real time inspection of network traffic of the endpoint device. As illustrated in FIG. 3, the endpoint agent may comprise a packet capturing module 1101 that may capture traffic flowing through a network in a systematic way and forward the traffic to the analysis engine for the analysis. The end point agent (e.g., mobile application, browser extension) may sniff traffic from OS TCP/IP drivers and forward it to the analysis engine for detailed inspection. Malicious attacks can be delivered to the endpoint device through multiple types of protocols like HTTP, HTTPS/SSL/TLS, FTP, SMPTP, DNS, SMB/CIFS, RPC or over raw TCP or UDP payloads designed to target multiple types of operating systems like Windows, Linux, Android, iOS, IOT devices and SCADA systems of the endpoint device.

In some embodiments of the present disclosure, the endpoint agent may comprise a protocol finger printing module 1102 configured to receive network traffic captured through packet capturing module 1101 and split it across multiple protocols so that it can be processed for further analysis on a per protocol basis. Once a network session is properly identified as belonging to a protocol family it can be pushed into the corresponding protocol queue to be processed by the analysis engine 1110. In some cases, the protocols that can be handled by the system may be divided into three main categories: 1) known protocols used both for malicious and benign purposes, 2) known protocols historically used only for benign purposes, and 3) unknown/custom protocols. Known protocols used for both benign and malicious purposes may include standard protocols like HTTP, HTTPS/SSL/TLS, FTP, SMPTP, DNS, SMB/CIFS, RPC and the like. Known protocols used only for benign purposes may be network protocols that have been observed historically used only for benign purpose like SIP, UPnP, NTP, SNMP and the like. All the protocols that are not part of known protocols used both for malicious and benign purposes or known protocols used only for benign purposes, may be labeled as unknown/custom protocols. These unknown/custom protocols may be used for benign and malicious purpose.

The analysis engine 1110 may process all the queues populated by the protocol finger printing module and may run them through a series of protocol and runtime analysis through the protocol analysis engine 1120 and the active analysis engine 1130. The analysis engine 1110 may comprise a protocol analysis engine 1120 and an active analysis engine 1130. A protocol analysis engine 1120 may comprise protocol feature extractors 1121, protocol self-learning classifiers 1125, and protocol analysis runtime 1219. The protocol analysis engine may identify potentially suspicious network traffic and pass it on to the active analysis engine. An active analysis engine 1130 may comprise active feature extractors 1131, active self-learning classifiers 1135, and active analysis runtime 1139.

Network traffic classified as malicious by the active analysis engine can be passed on to the incident management engine 1140. In some embodiments, the incident management engine may reside on the cloud. In some cases, the incident management engine may be a component of the endpoint management system 220. For instance, the incident management engine may be part of the management and reporting console 221. If during analysis, a particular flow is found to be malicious, it may be handed over to the incident Manager module 1140 for further processing. In some cases, the flows found to be benign by both the protocol and active analysis engine may be marked as benign and/or may be discarded. The incident management engine 1140 may comprise an incident manager 1141 that interacts with a blocking module 1150, a notification module 1160, a central database 1142, and a threat attribution engine 1170 that may access databases including the threat name encyclopedia 1172, and the hacker groups encyclopedia 1174. Information from the incident management engine may be displayed to administrators via a user interface 1180 (e.g., provided by management and reporting console 221 in FIG. 2).

Referring back to FIG. 2, the endpoint agent 210 may provide the protection such as interception, blocking phishing sites 213, quarantine phishing SMS 215, generate user warning alert 217 and the like as a browser extension or built-in agent running on the endpoint device. For instance, the mobile endpoint agent may be built into or coupled to the various mobile applications thereby providing a seamless and unified user experience. For example, a user may receive in-app notifications or warning (e.g., mobile browser warning message) if a malicious server or content is detected. The endpoint agent may stop subsequent connection attempts through real time blocking capabilities, once the attack is detected by the on-device ML analysis engine 211 and/or the detection cloud 223. This real time blocking can be achieved through multiple ways. For instance, if the endpoint agent is deployed as a mobile application the blocking module may call the OS network APIs to block the subsequent connection attempts to the malicious destination. In case the system is deployed as an appliance or cloud in inline mode where all the traffic is flowing in and out of appliances or cloud network interfaces, the system may add a blocking rule at its interface level.

The endpoint agent 210 may be built into existing applications running on the endpoint devices (e.g., email, browser, social media, search, messaging apps, software, etc.) without disrupting user experience with existing applications. For example, upon detection of the phishing attacks, the endpoint agent may intercept and/or block the phishing sites, quarantine the message, and/or alert the end user. For example, malicious SMS/text messages or malicious content in the SMS message (e.g., money transfer, link, etc.) may be accurately identified and the malicious SMS message may be quarantined automatically.

The endpoint agent 210 may comprise a communication module to establish communication between the endpoint agent and the endpoint management system 220. The communication module may be configured to transmit data generated by the endpoint agent 210 or the on-device ML analysis engine 211 (e.g., report security incident 235, extracted features, real-time telemetry data, potentially malicious content, etc.) to the remote endpoint management system for further analysis and receive data transmitted from the remote endpoint management system (e.g., machine learning trained model such as trained classifiers in FIG. 3, intelligence data 231, on-demand URL scanning result 233, notification, scheduled report, etc.).

In some embodiments, the endpoint agent 210 may comprise a user interface module to provide a user interface on the endpoint device. The user interface may allow users to view real-time phishing attacks, incident reports, educational warning page to show details on phishing threat and safe preview of a detected attack, real-time notification and daily incident report summaries and various others. The user interface module may deliver information and content to be displayed on the endpoint device related to the cyber attacks, for example, by way of one or more web pages or pages/views of a mobile application. The user interface (UI) module may provide a graphical user interface (GUI) that can be integrated into other applications (e.g., endpoint management software, UEM applications), or via any suitable communication channels (e.g., email, Slack, SMS) for delivering notifications. A user may provide user input via the GUI such as to preview a detected phishing attack, view details of a detected attack, receive real-time notification and daily incident report summaries, set up protections on the endpoint device (e.g., enable/disable functions of the endpoint agent) and various others. Examples of the endpoint agent are described later herein.

The graphical user interface (GUI) or user interface may be provided on a display of the endpoint device. The display may or may not be a touchscreen. The display may be a light-emitting diode (LED) screen, organic light-emitting diode (OLED) screen, liquid crystal display (LCD) screen, plasma screen, or any other type of screen. The display may be configured to show a user interface (UI) or a graphical user interface (GUI) rendered through an application (e.g., via an application programming interface (API) executed on the user device, on the cloud).

The endpoint management system 220 can be the same as the endpoint management system as described in FIG. 1. In some embodiments, the endpoint management system may comprise a management and reporting console 221 and detection cloud 223. The endpoint management system 220 may also provide an integration point for a variety of Security Information and Event Management (SIEM) systems and existing third-party systems (e.g., security information and event management (SIEM), security orchestration, automation and response (SOAR), Unified endpoint management (UEM), threat Intelligence Platform (TIP), etc.) via APIs.

As described above, the endpoint agent or remote endpoint protection system may employ a series of machines learning trained classifiers or trained predictive models. As described above, the predictive models may be trained, developed and built on the cloud and is downloaded to the endpoint device or executed by the endpoint agent for inference. A predictive model may be a trained model or trained machine learning algorithm. The machine learning algorithm can be any type of machine learning network such as: a support vector machine (SVM), a naïve Bayes classification, a linear regression model, a quantile regression model, a logistic regression model, a random forest, a neural network, convolutional neural network CNN, recurrent neural network RNN, a gradient-boosted classifier or repressor, or another supervised or unsupervised machine learning algorithm (e.g., generative adversarial network (GAN), Cycle-GAN, etc.

In some cases, the remote endpoint protection platform 200 may generate predictive models with continual training or improvement after deployment. The predictive model provided by the platform may be dynamically adjusted and tuned to adapt to different users, endpoint device, threats over time. The predictive model provided by the platform may be improved continuously over time (e.g., during implementation, after deployment). Such continual training and improvement may be performed automatically with little user input or user intervention.

In some embodiments, the predictive model module may employ supervised learning, semi-supervised learning or un-supervised learning techniques to train the plurality of classifiers. For example, the classifiers may be self-learning classifiers as described elsewhere herein. In another example, the un-supervised learning model network for feature extraction may comprise an autoencoder. During the feature extraction operation, the autoencoder may be used to learn a representation of the input data for dimensionality reduction or feature learning. The autoencoder can have any suitable architecture such as a classical neural network model (e.g., sparse autoencoder, denoising autoencoder, contractive autoencoder) or variational autoencoder (e.g., Generative Adversarial Networks). In some embodiments, a sparse autoencoder with an RNN (recurrent neural network) architecture, such as LSTM (long-short-term memory) network, may be trained to regenerate the inputs for dimensionality reduction. For example, an encoder-decoder LSTM model with encoder and decoder layers may be used to recreate a low-dimensional representation of the input data to the following model training despite a latent/hidden layer. In some cases, the process of training a predictive model may comprise extracting unsupervised features from network data streams or network data flow. The input data for training the predictive model can be two-dimensional array or high-dimensional depending on the structure of the classifier. In some embodiments, the network flow data may not include labeled dataset. In some cases, the extracted features and the output of the autoencoder (e.g., low-dimensional representation of the input data) may be used for training one or more classifiers for extracting protocol features or active features, determining a malicious server and the like. The classifiers can be of any suitable type, including but not limited to, KNN (k-nearest neighbor), support vector machine (SVM), a naïve Bayes classification, a random forest, decision tree models, convolutional neural network (CNN), feedforward neural network, radial basis function network, recurrent neural network (RNN), deep residual learning network and the like.

The management and reporting console 221 may perform various functions including those described in FIG. 3 (e.g., incident management engine). For example, the management and reporting console 221 may include an incident manager (e.g., an incident manager 1141 of FIG. 3) directing a notification module (e.g., Notification Module 1160 of FIG. 3) to notify the system administers or Incident response team about the malicious incident via Email Notification, log the incident information through a SIEM Integration Module or a Syslog Integration Module. The management and reporting console 221 may include a management console same as the management console as described in FIG. 1. For instance, the management and reporting console 221 may provide management console allowing administrators to manage summary report, endpoint agents, end users, endpoint devices (e.g., groups, policies, clients, and licenses), generate real-time phishing incident alerts, and various others.

In some cases, administrators may be permitted to receive real-time phishing incident alerts via email or other notification channel, or receive a summary report (e.g., hourly, daily, weekly, etc.), manage the endpoint agents, endpoint devices (e.g., groups, policies, clients, and licenses) via a management user interface provided by the UI module. The management user interface (e.g., portal, administrator console, management user interface, etc.) may provide users (e.g., administrators) real-time phishing incident alerts, summary report, or portal to manage the endpoint agents, end users, endpoint devices (e.g., groups, policies, clients, and licenses). A user or system administrator can login to the portal or access the portal by entering a user name and password. In some instances, login can require two factor authentication, wherein the user must authenticate by providing a password that was supplied through other means e.g. by a dongle, via text to a mobile device or through an external application running on a mobile device.

In some embodiments, the management user interface (UI) module may allow administrators for viewing analytics, real-time phishing incident alerts, summary report across multiple endpoint devices, or for developing and deploying analytics expressions, deploying endpoint agents (e.g., mobile applications) to groups of endpoint devices.

In some cases, the management user interface may include a graphical user interface (GUI) provided on a display. The display may or may not be a touchscreen. The display may be a light-emitting diode (LED) screen, organic light-emitting diode (OLED) screen, liquid crystal display (LCD) screen, plasma screen, or any other type of screen. The display may be configured to show a user interface (UI) or a graphical user interface (GUI) rendered through a mobile application or cloud application (e.g., via an application programming interface (API) executed on the administrator's user device).

The provided endpoint agent may provide various functionalities such as showing endpoint users a safe preview of the Phishing site, allow the endpoint users to send a support request from the warning screen, analyze Websites and SMS and similar messaging services locally using machine learning techniques, natural language processing, Computer Vision as described above without sending private information to the cloud, perform remote Url scan for the detection purpose, and the like.

In particular, the endpoint agent provides a Safe Preview Feature allowing endpoint users to view the blocked threats (e.g., webpage) in a convenient manner. The safe preview of a phishing site can be accessible to the end user via multiple channels such as on the warning page, on a threat detail page, email admin alert, and CMS. The safe preview may include at least a thumbnail image or screenshot of the phishing site that is browsed from the virtual browser as described above along with details about the threat. A user may share (e.g., download or share) the Safe Preview of the blocked page with other users to warn them and for training purpose.

The image of the phishing site may be provided by the cloud-based technology such as the virtual browsers techniques as described above. The virtual browser techniques may analyze the behavior and content of a suspected Url. Artifacts such as screenshot, text, and HTML are extracted from the rendered page to detect the presence of a phishing attack. The artifacts such as the screenshot may also be used by the endpoint agent for education purposes. For instance, when the endpoint agent blocks a Url, the endpoint agent may request the management cloud for a copy of the screenshot that it had stored at the time of detection so that the screenshot may be presented to the end-user on the endpoint warning alerts or as a preview of the phishing site. At the same time, management could may send the same screenshot as part of the admin Email Notification and displays on the management dashboard. The virtual browser techniques may be implemented by the detection cloud 223 as described above. For instance, the on-demand URL scanning may be performed by the detection cloud by loading the candidate webpage (identified as potentially suspicious by the on-device analysis engine/endpoint agent) to a virtual browser memory on the cloud, interacting with the candidate webpage and collecting the forensics intelligence on the candidate webpage behavior.

Examples of Endpoint Agent

FIGS. 4-14 show examples of endpoint agents, in accordance with embodiments of the present disclosure. The endpoint agents may be deployed to endpoint devices as mobile applications or browser extensions. The endpoint agent is able to protect users from phishing attack across multiple attack vectors. FIG. 4-FIG. 7 show an example of endpoint agent blocking and warning users about a variety of phishing attacks.

Figure 4:
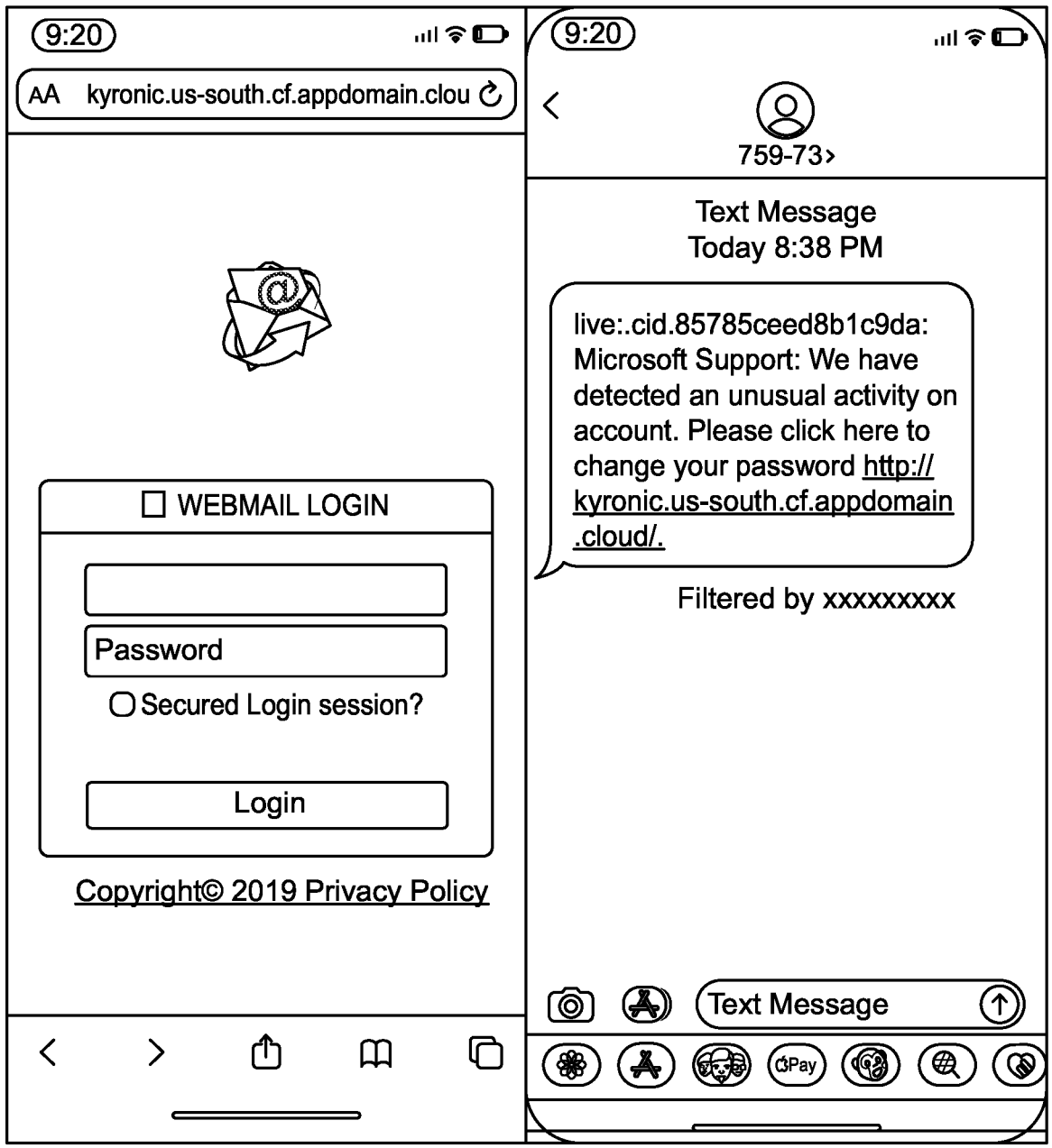
FIG. 4 show an example of endpoint agent quarantining a Phishing SMS message by automatically moving it to Junk SMS Folder.
Figure 5:
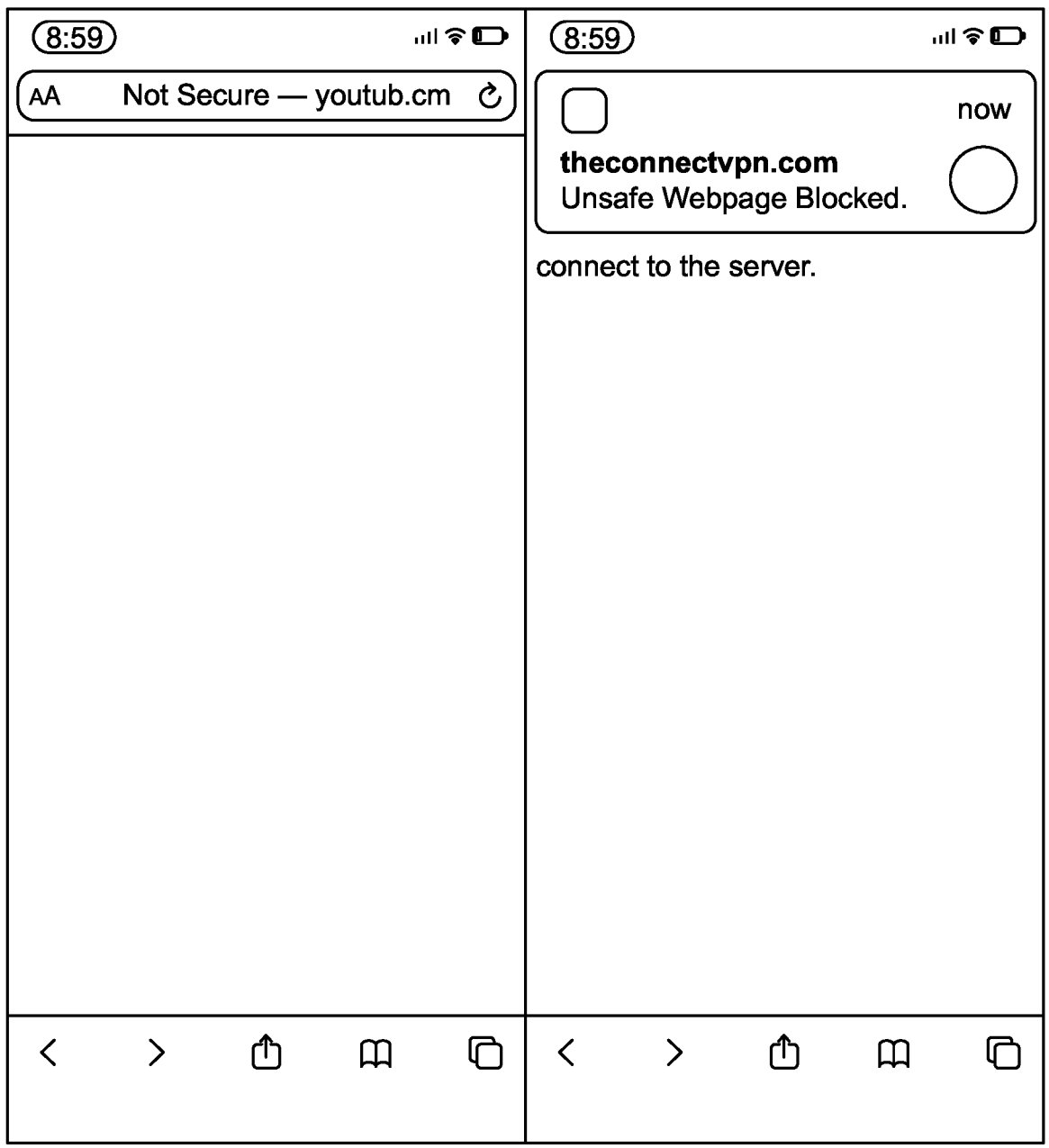
FIG. 5-FIG. 7 shows an example of the endpoint agent protecting users from, Web typo squatting, email and Skype based phishing attack involving links and social engineering bait text.

FIG. 4 shows various examples of attack vectors such as SMS text messages, mobile browsers, credential login and the like can be protected by the endpoint agent in a built-in and seamless fashion to prevent mobile-centric phishing attacks. The phishing attack may contain malicious content delivered via the SMS text message, social media, messaging apps, and the like and can be detected by the built-in endpoint agent. FIG. 5 shows an example of the endpoint agent blocking webpage/server connection upon detection of a phishing attack (e.g., malicious server, fake page) in a mobile browser. For instance, a user may misspell a domain name, the built-in endpoint agent may block the website as unsafe and generate an alert (e.g., "Unsafe Webpage Blocked"). The alert may be delivered to the user as a visual notification within the browser, on a display of the user device, or via other cues (vibration, audio alarm, etc.)

Figure 8:
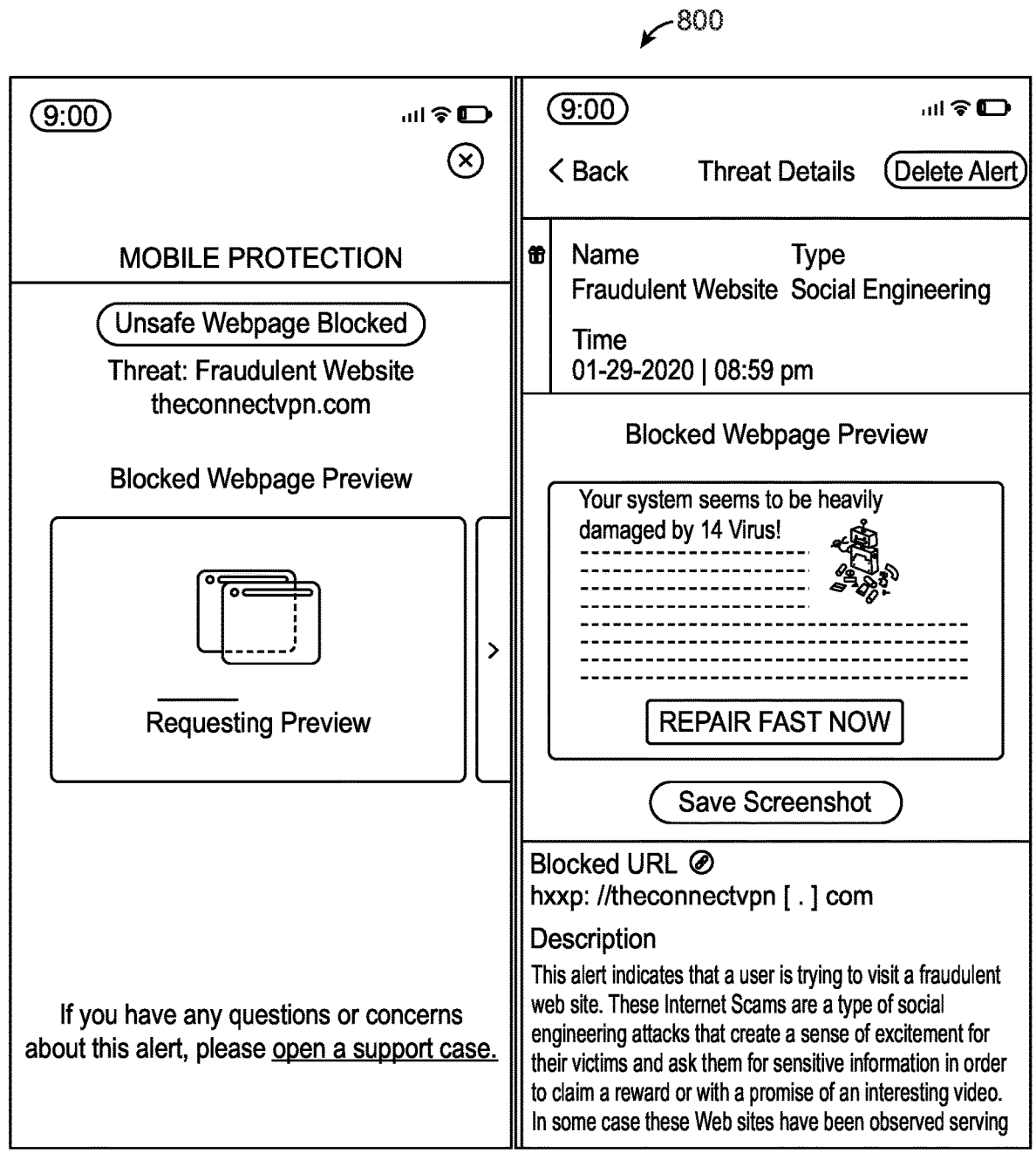
FIG. 8 shows an example of the endpoint agent blocking a phishing attack and showing a warning alert to an end user.

More information about a detected threat such as the detected unsafe website can be viewed via the user interface provided by the endpoint agent (e.g., mobile application). FIG. 8 shows an example of user interface 800 displaying phishing attack information on a mobile application following the unsafe webpage being detected in FIG. 4-FIG. 6. The user interface may display detailed information to the user about why the webpage is blocked, the type of threat, URL, a preview of the blocked webpage in a safe mode (e.g., screenshot of the fraudulent webpage).

Figure 6:
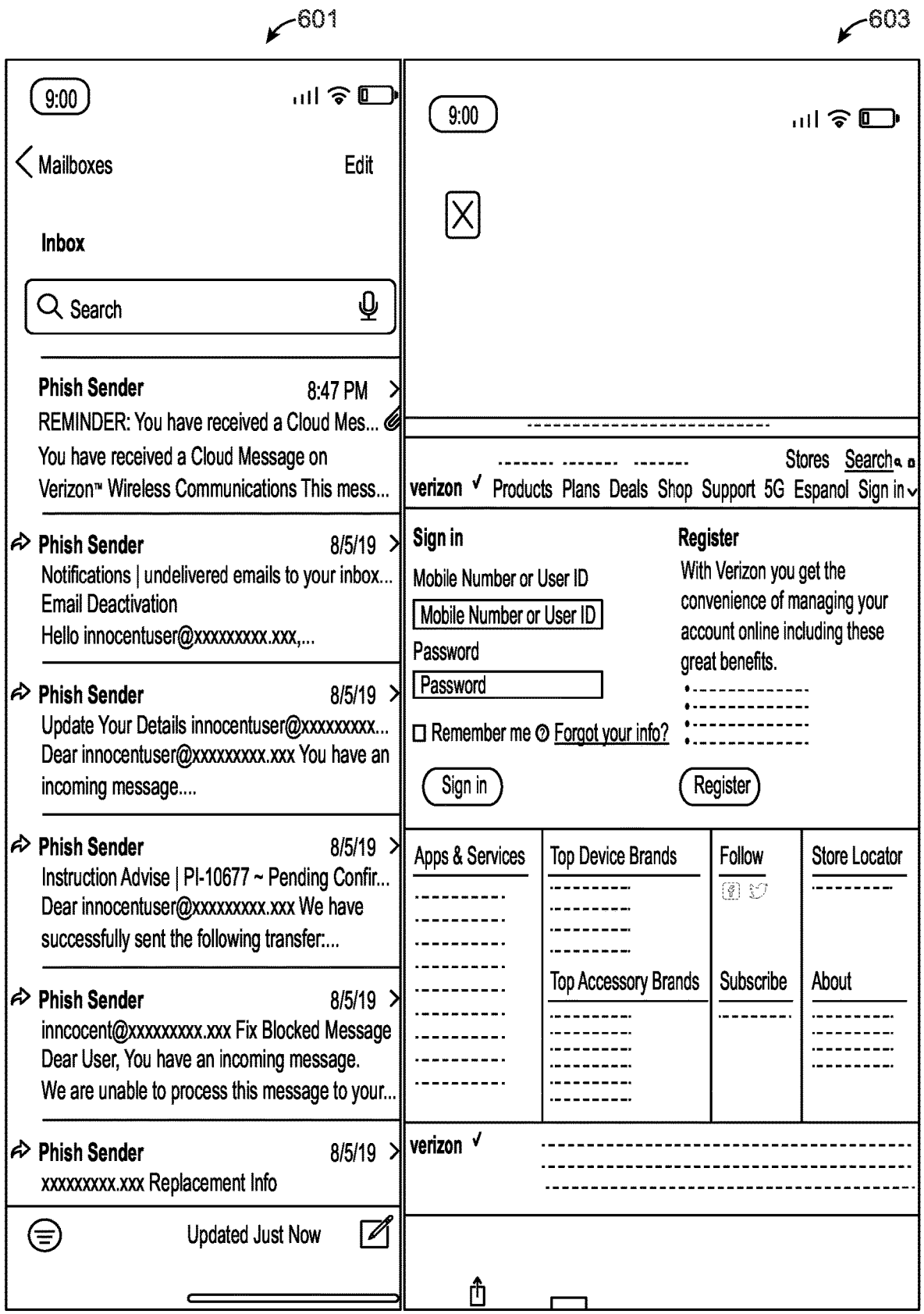

FIG. 6 shows an example of the endpoint agent protecting users from email phishing attack delivered through links or malicious content in an email. If the user clicks the link in a phishing email 601 and is directed to a webpage, the endpoint agent blocks the page and provides user with information about the threat along with a safe preview of the blocked webpage in the user interface 603. Similarly, the endpoint agent can protect users from SMS text message phishing attack delivered through links or malicious content in the SMS text message. If the link is malicious, the message may be quarantined (e.g., placed in junk message).

Figure 7:
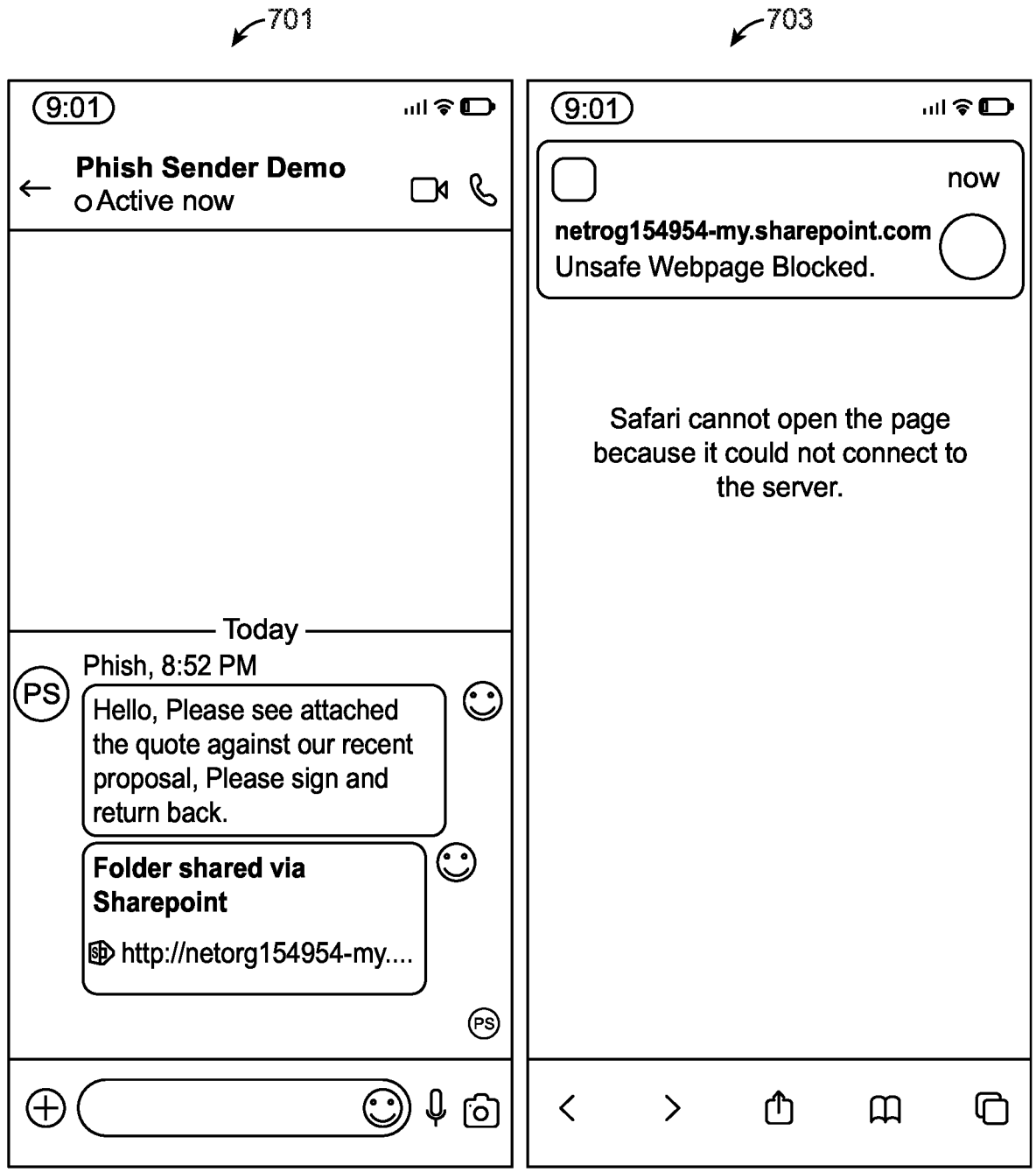

FIG. 7 shows an example of the endpoint agent protecting users from phishing attacks delivered through various messaging apps (e.g., Facebook® messenger, Twilio SMS, Skype®, Slack, etc.). For example, such messaging apps may involve links to malicious/phishing websites 701 luring users to download malware, the endpoint agent can detect such as malicious websites and block the website to protect users 703.

Figure 9:
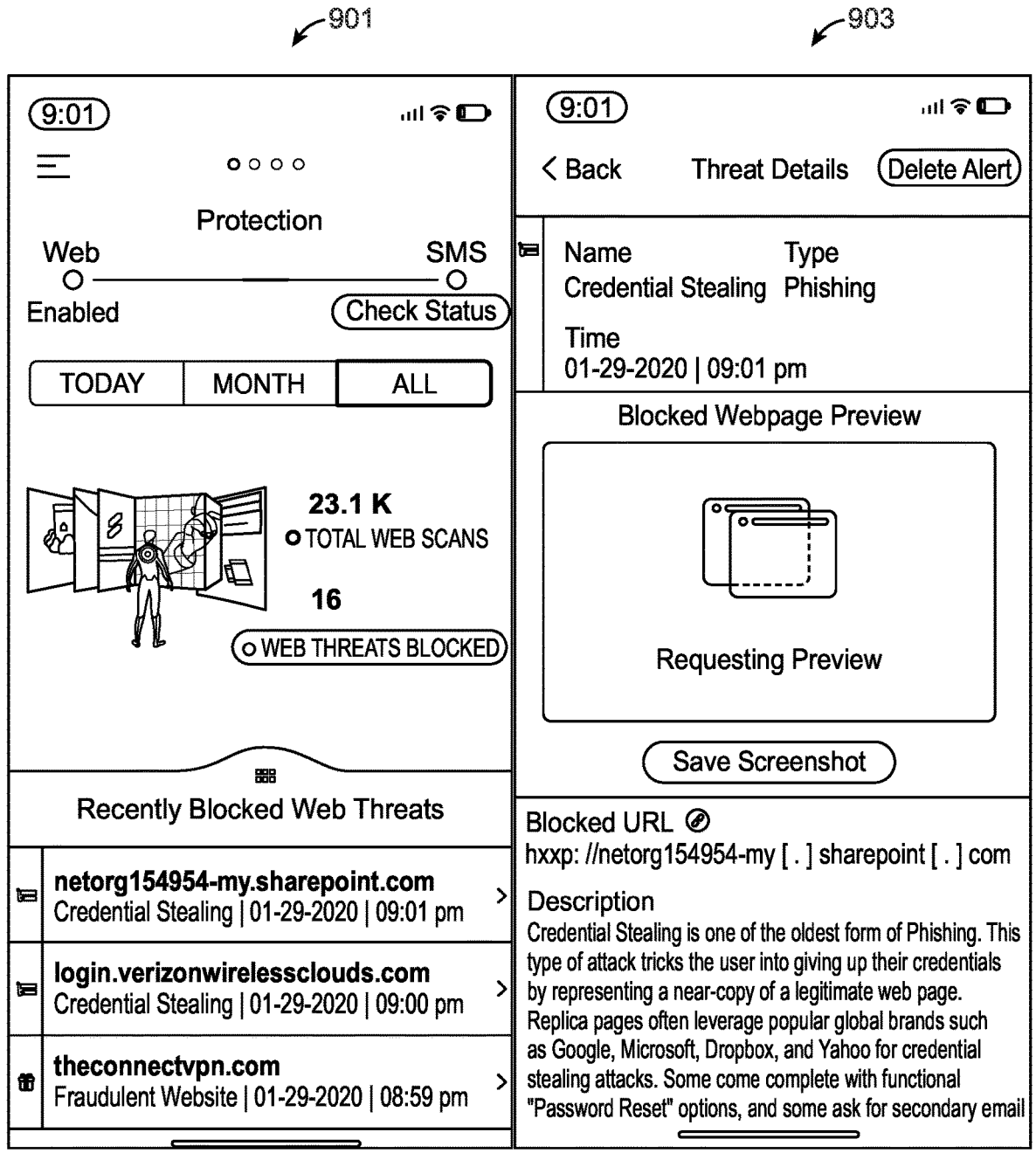
FIG. 9 shows an example of dashboard view of recently blocked threats, along with statistics for web scans and web threats.

FIGS. 8-12 show various examples of user interfaces of an endpoint agent deployed to a mobile device to provide simple, intuitive user experience with capabilities of reporting, and configuring the endpoint protection. FIG. 9 shows an example of dashboard view 901 of recently blocked threats, along with statistics for web scans, web threats blocked for the day, week, month, or all. A user may click a given threat to view more threat details 903 such as the name, type, and time of the threat, the URL and a description of the type of threat for education.

Figure 10:
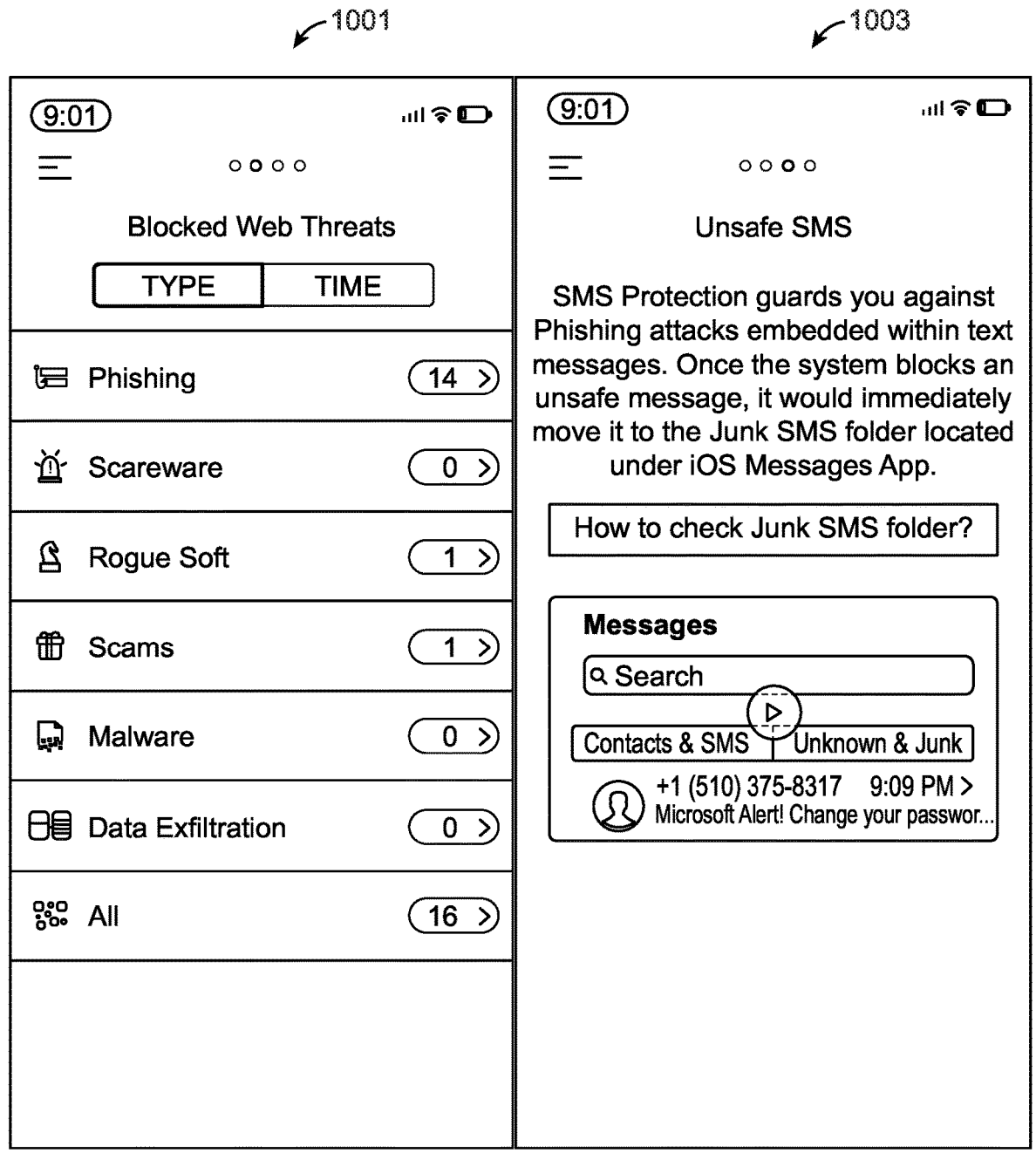
FIG. 10 shows an example of user interface displaying blocked web threats and unsafe SMS.
Figure 11:
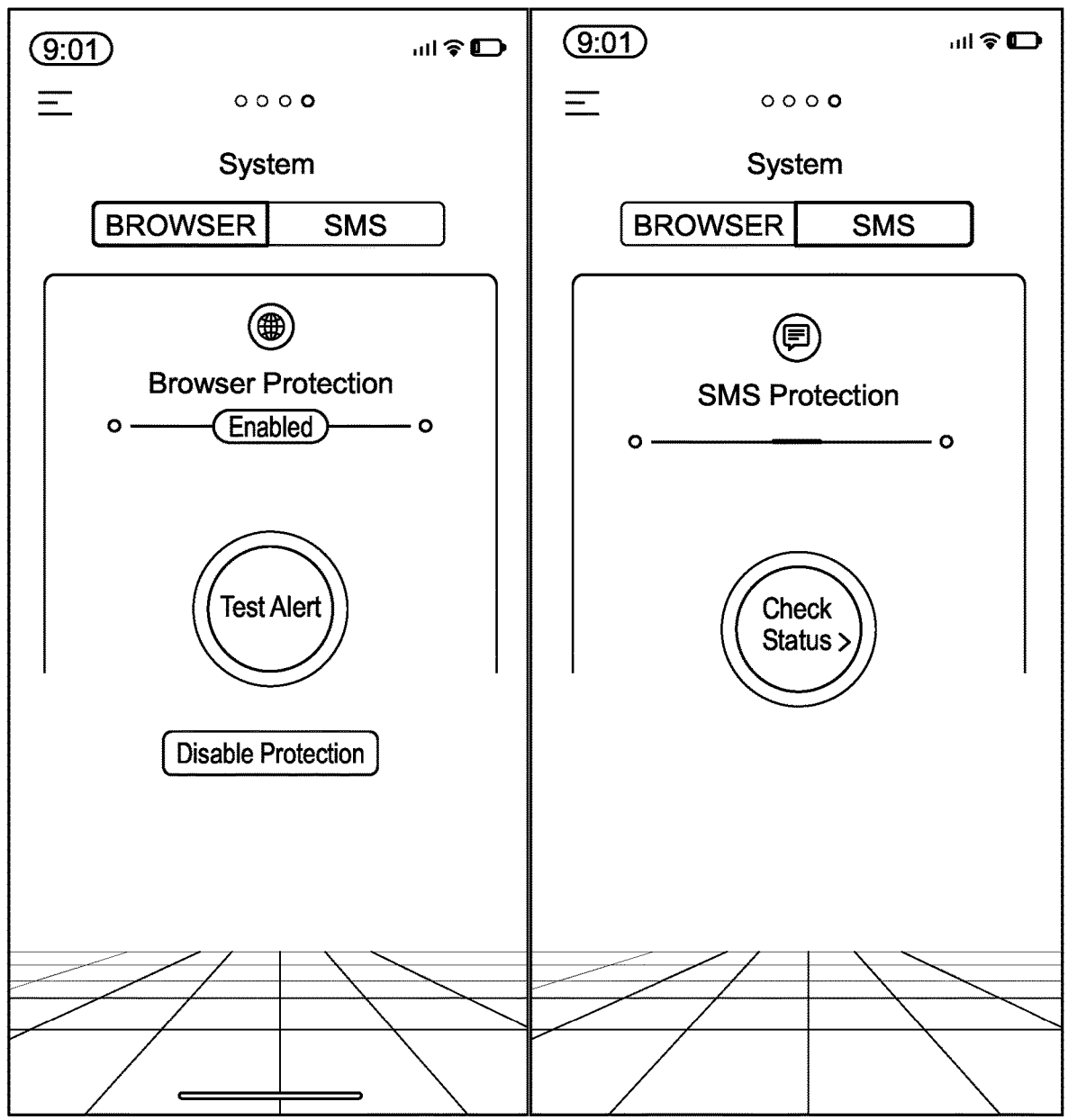
FIG. 11 shows an example of user interface allowing users to test and check the overall status of the system.
Figure 12:
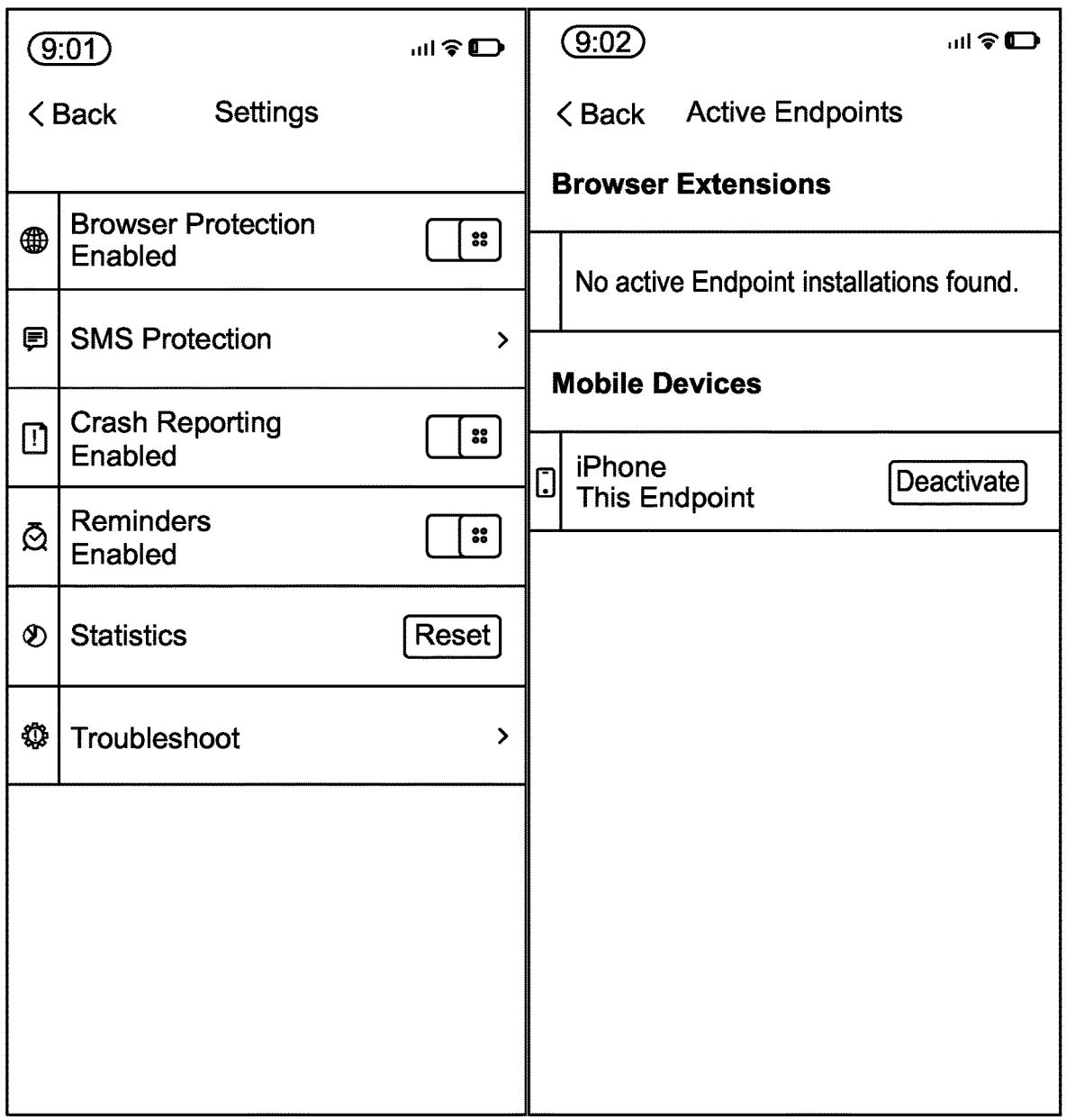
FIG. 12 shows an example of user interface allowing users to set up various protections.

FIG. 10 shows an example of a user interface 1001 displaying blocked web threats categorized by various threat types such as phishing, scareware, rogue soft, scams, malware, data exfiltration, etc. The user interface may also provide educational page on phishing attack such as unsafe SMS text messaging. FIG. 11 shows an example of user interface allowing users to test and check the overall status of the system. For example, a user can enable/disable the browser protection and SMS protection respectively and test the alert. FIG. 12 shows an example of user interface allowing users to set and configure various protections. For example, a user may enable/disable browser protection, SMS protection, set up reporting, reminder, and trouble shooting in the setting view.

FIGS. 13-14 show examples of an endpoint agent deployed as a browser extension to provide simple, intuitive user experience with reporting, and configuring the endpoint protection. FIG. 13 shows an endpoint agent deployed as a browser extension 1301, when clicked displaying various user interfaces such as a dashboard view 1303 of recently blocked threats, webpages scanned, web threats blocked for the day, week, month, or all. A user may view the threats and reports within a thumbnail view or click a given threat to view more threat details such as the detailed threats 1404 shown in FIG. 14. Threat details such as name, type, and time of the threat, the URL and a description of the type of threats along with a safe preview of the blocked webpage 1401 can be displayed. The dashboard view 1303 may also include a "test alert" button 1305 allowing a user to test an alert. In response to a user clicking on the test alert button 1305, a warning window 1307 illustrating an alert of an unsafe webpage is displayed to the user. In the illustrated example, concurrently with displaying the warning page, a preview of the blocked webpage may be displayed. A thumbnail image of the blocked webpage can be browsed safely from the virtual browsing cloud (e.g., detection cloud as described above). The screenshot or thumbnail image of the blocked webpage may be downloadable 1309. A user may share the image safely with others for education or warning purpose. The image may be saved in the database for further training the predictive models and various other purposes.

Figure 15:
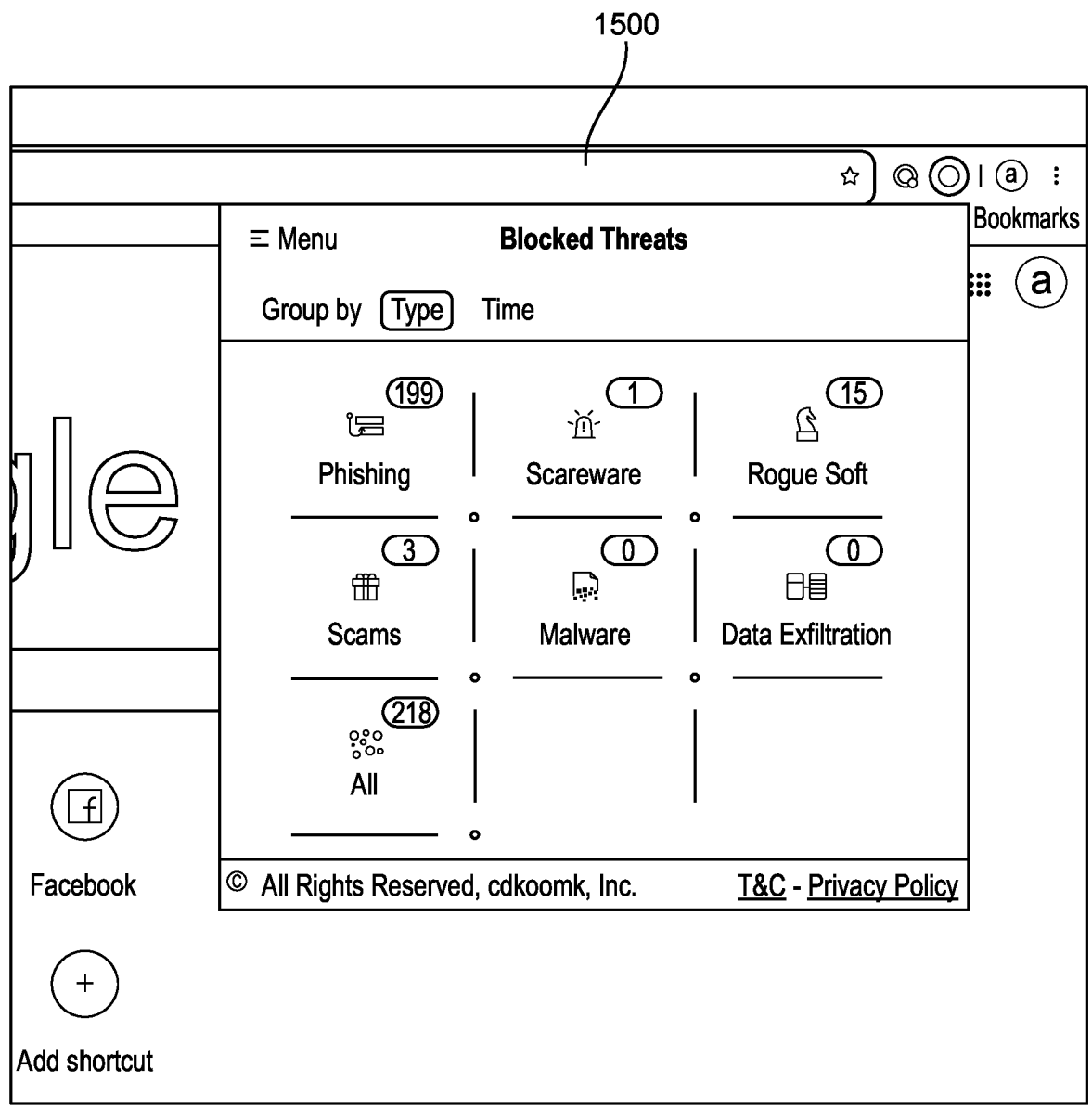
Figure 16:
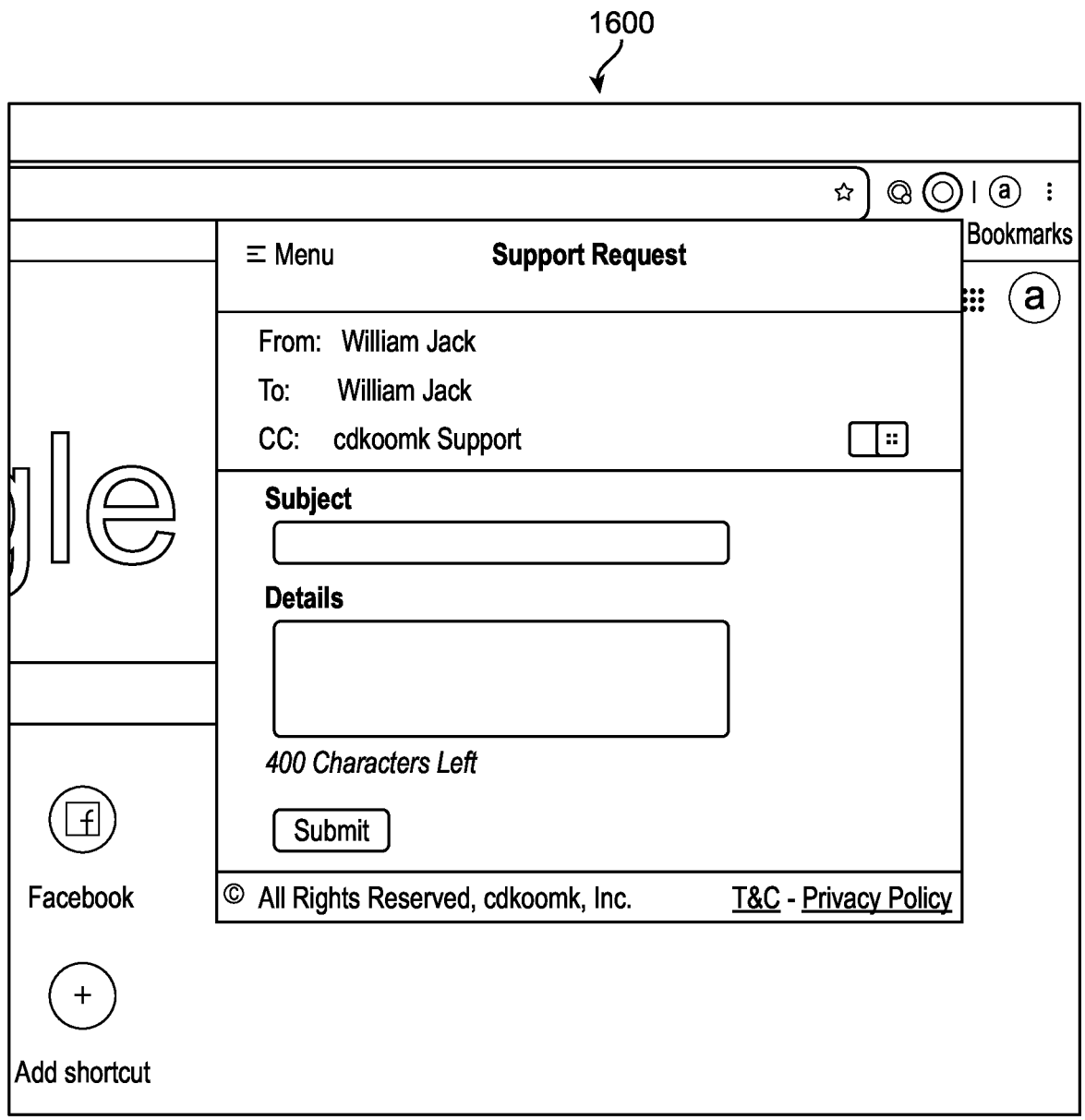

FIG. 14 shows an example of user interface 1405 allowing users to set up various protections. For example, a user may enable/disable the protection and reminder, reset statistics and trouble shooting (e.g., enable/disable logging, enable/disable auto submit error logs, test alert, run diagnostics, etc.) within the setting view. FIG. 15 shows an example of user interface 1500 displaying the blocked threats. A user may be permitted to view the blocked web threats categorized by various threat types such as phishing, scareware, rogue soft, scams, malware, data exfiltration, all, or view the blocked web threats grouped by time. FIG. 16 shows an example of user interface 1600 allowing a user to provide in-extension feedback or support request.

Examples of Management Console

FIGS. 17-27 show examples of user interfaces of management console, in accordance with embodiments of the present disclosure. The management console may provide a management user interface (e.g., portal, administrator console, management user interface, etc.) to display or present information to a user or system administrator. For instance, the management user interface provides users (e.g., administrators) real-time phishing incident alerts, summary report, or portal to manage the endpoint agents, endpoint devices (e.g., groups, policies, clients, and licenses). A user or system administrator can login to the portal or access the portal by entering a user name and password. In some instances, login can require two factor authentication, wherein the user must authenticate by providing a password that was supplied through other means e.g. by a dongle, via text to a mobile device or through an external application running on a mobile device. In some embodiments, the management console may comprise a management user interface (UI) module for viewing analytics, real-time phishing incident alerts, summary report, or for developing and deploying analytics expressions, deploying endpoint agents (e.g., mobile applications) to the endpoint devices, monitoring predictive model performance, and configuring a predictive model.

Figure 17:
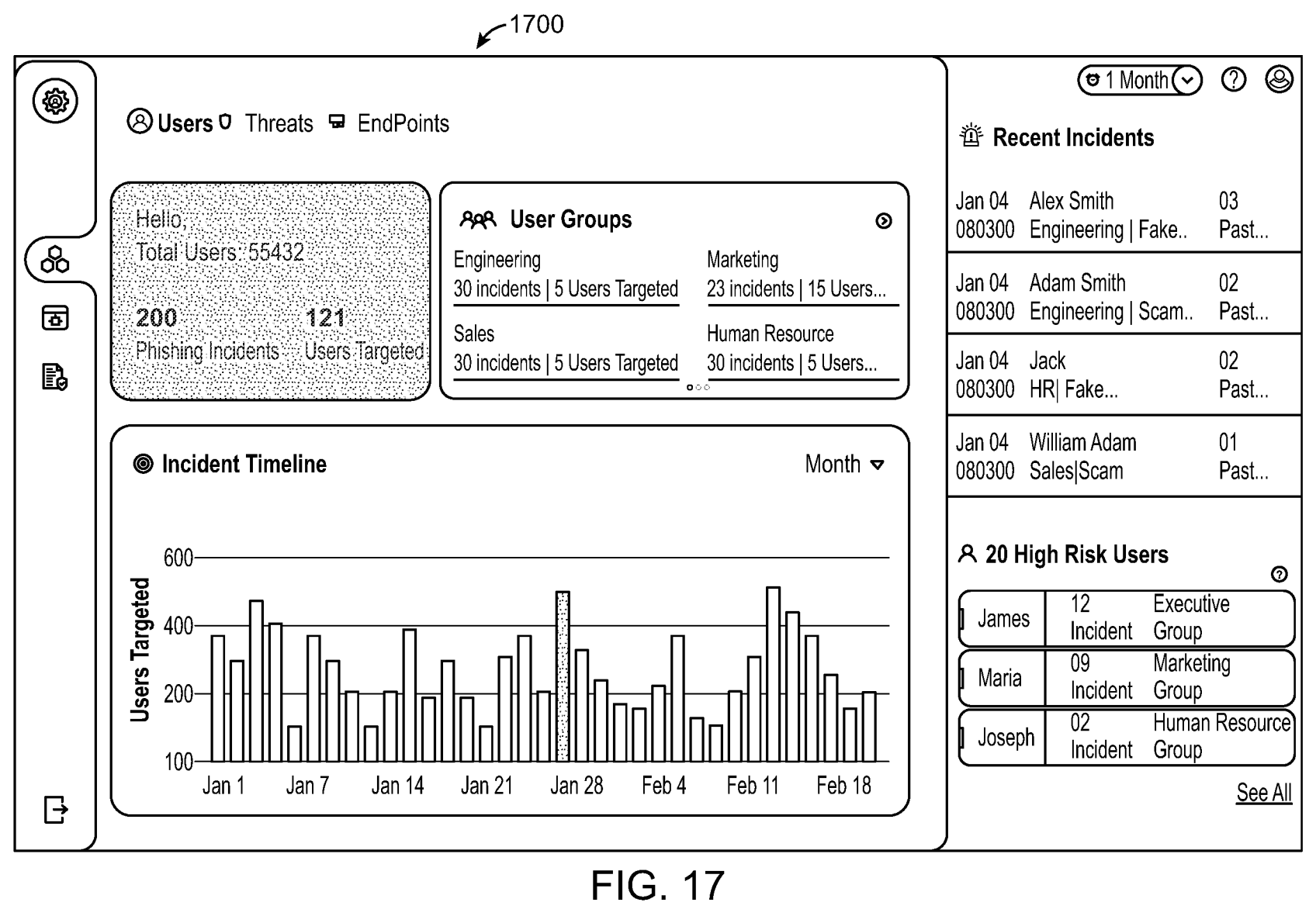

FIG. 17 shows an example of dashboard view 1700 of the management console for managing threats and incidents by user groups. The dashboard view 1700 (e.g., user view) may permit administrator to manage users protected by the remote endpoint protection system. For example, users can be managed by groups (e.g., engineering, marketing, sales, human resources, etc.), high risk users, recent incidents/threats detected in association with particular users. The dashboard may also display an incident timeline showing the number of targeted users in the daily scale, weekly scale, monthly scale, or yearly scale.

FIG. 18 shows an example of a dashboard view 1800 of the management console for managing threats, reports and statistics. For example, the threat dashboard view may display the recent threats along with detailed information such as URL, threat name, users targeted, a safe preview of the threat, infection vectors (e.g., phishing links, SMS phishing, etc.), threats timeline (e.g., daily scale, weekly scale, monthly scale, or yearly scale), and threats statistics organized by the threat types (e.g., phishing, scareware, rogueware, others, etc.).

Figure 19:
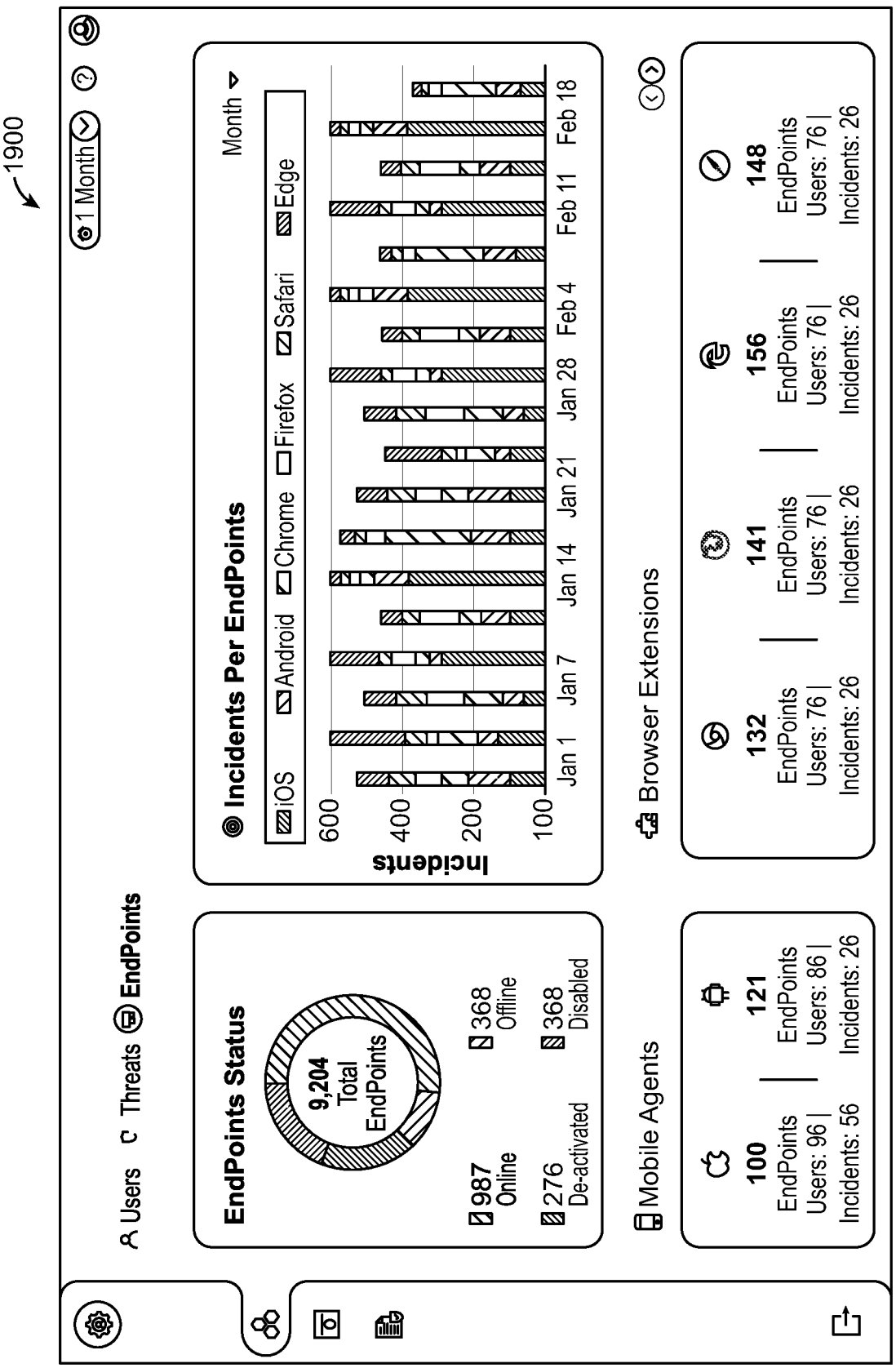

FIG. 19 shows an example of a dashboard view 1900 of the management console for managing the endpoints. For example, the endpoint dashboard view 1900 may display the endpoint status (e.g., chart, diagram, plot about the number of online, offline, deactivated, disabled of endpoints), threats timeline (e.g., daily scale, weekly scale, monthly scale, or yearly scale), bar plot or chart about incidents per endpoints (e.g., incidents per endpoint device type), mobile agents statistics per endpoint type (e.g., number of users of using iOS, Android, number of incidents per device type, etc.) and browser extensions statistics per endpoint type (e.g., number of users of using Chrome, Firefox, Safari, Edge, number of incidents per device type, etc.).

FIGS. 20-23 show an example of a dashboard view of the management console for managing the incidents. FIG. 20 shows an example of dashboard 2000 for managing incidents. The list of incidents may include information about the incidents such as targeted users, user group, user history, blocked threat (e.g., fake login page, rogue software), incident vector (e.g., phishing link, phishing SMS, etc.), incident time and various other information. The incident management dashboard 2000 may also permit users to modify one or more fields. For example, an administrator may modify the user group associated with an incident via the drop-down menu.

Figure 21:
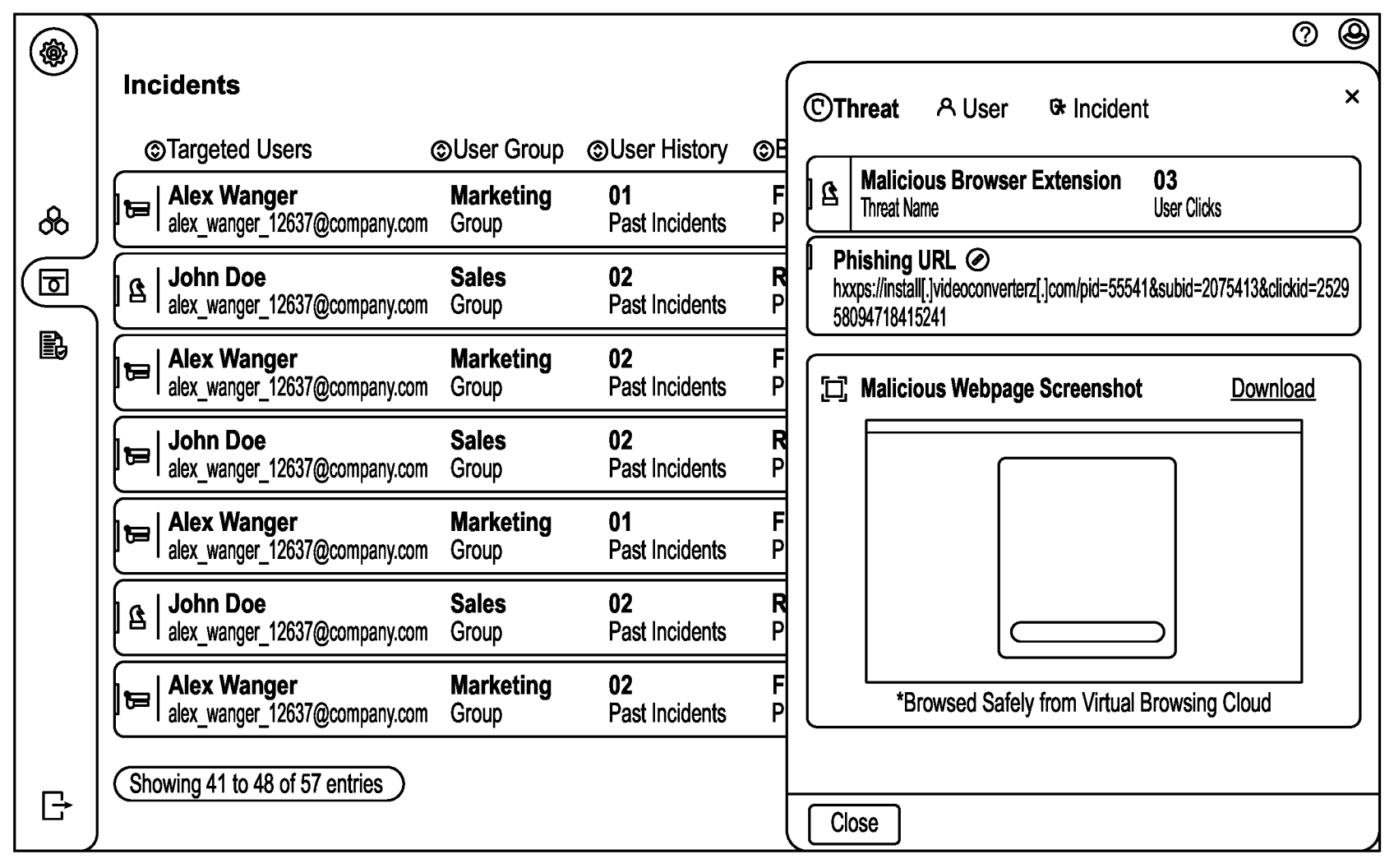
Figure 23:
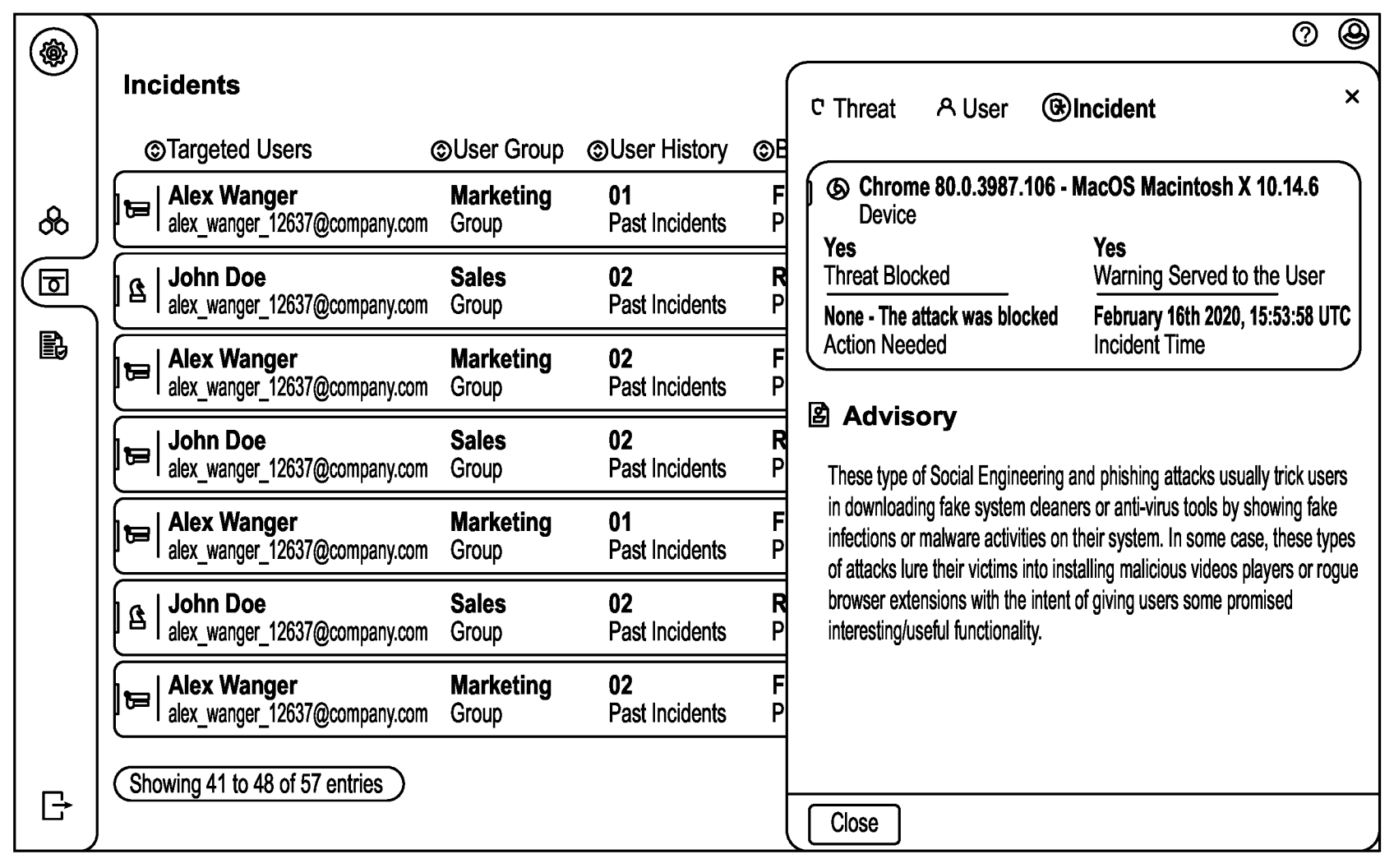

FIGS. 21-23 show various examples of an incident dashboard for displaying detailed information about the incidents. FIG. 21 shows an example of the dashboard displaying threat details such as threat name (e.g., malicious browser extension), phishing URL, and safe preview of the detected threat (e.g., malicious webpage screenshot). FIG. 22 shows an example of the dashboard displaying user information associated with an incident such as user profile (e.g., user name, role, user group, contact, etc.), user risk score, incident history of the user and the like. FIG. 23 shows an example of the dashboard displaying incident details such as the endpoint type, actions taken by the endpoint agent upon detection of the threat (e.g., blocked, warning message), and advisory information for user education.

Figure 24:
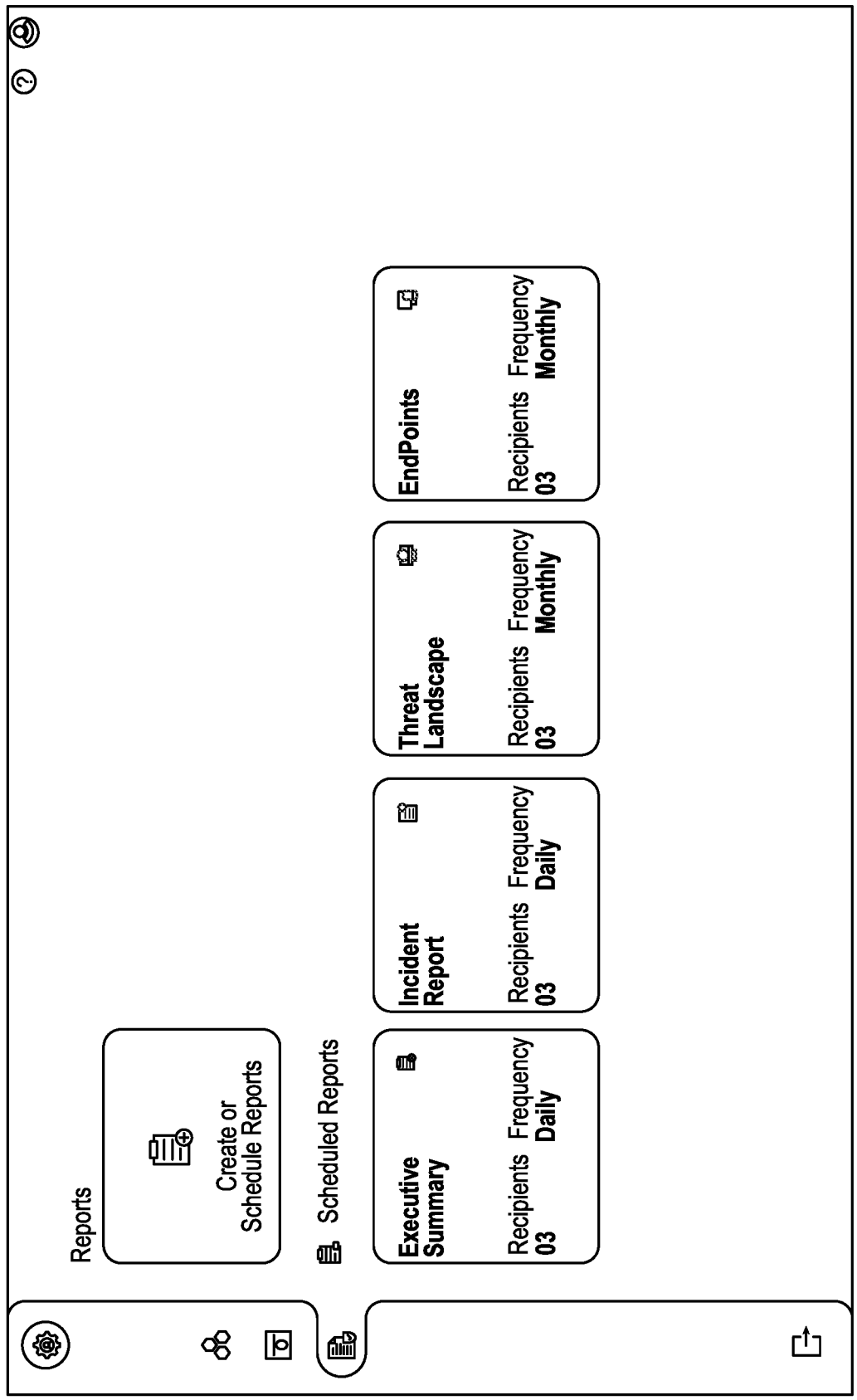
Figure 25:
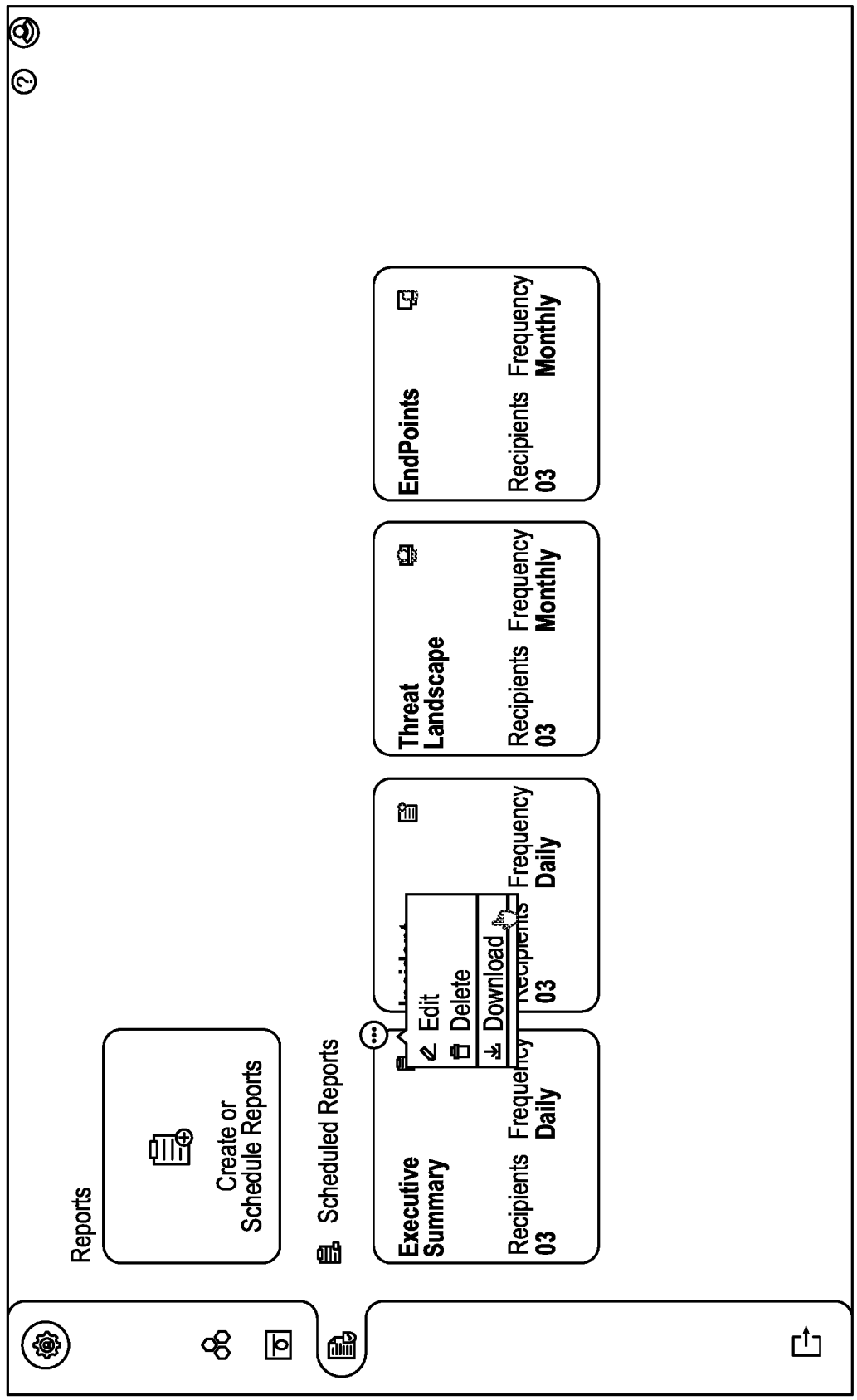
Figure 26:
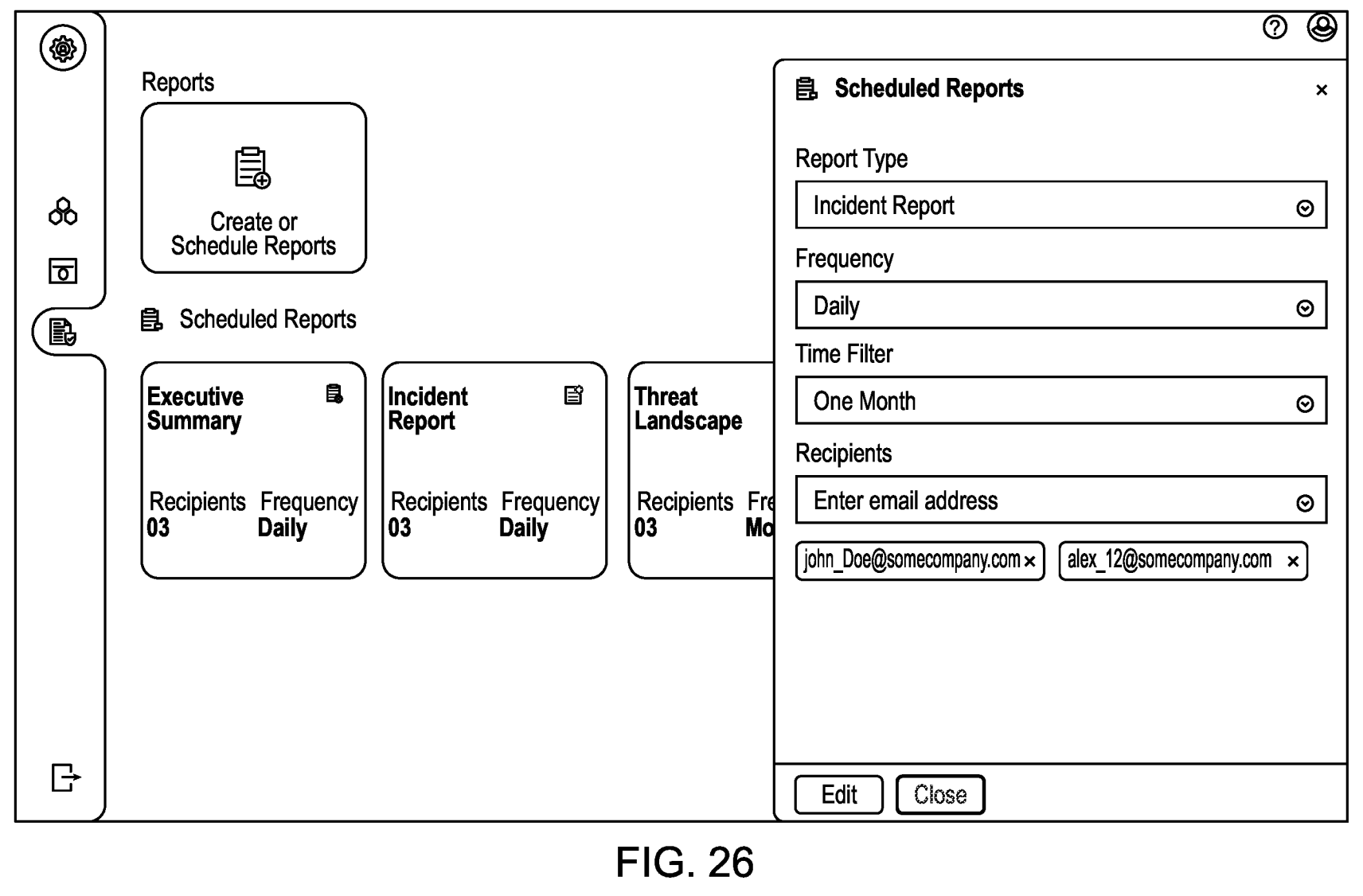
Figure 27:
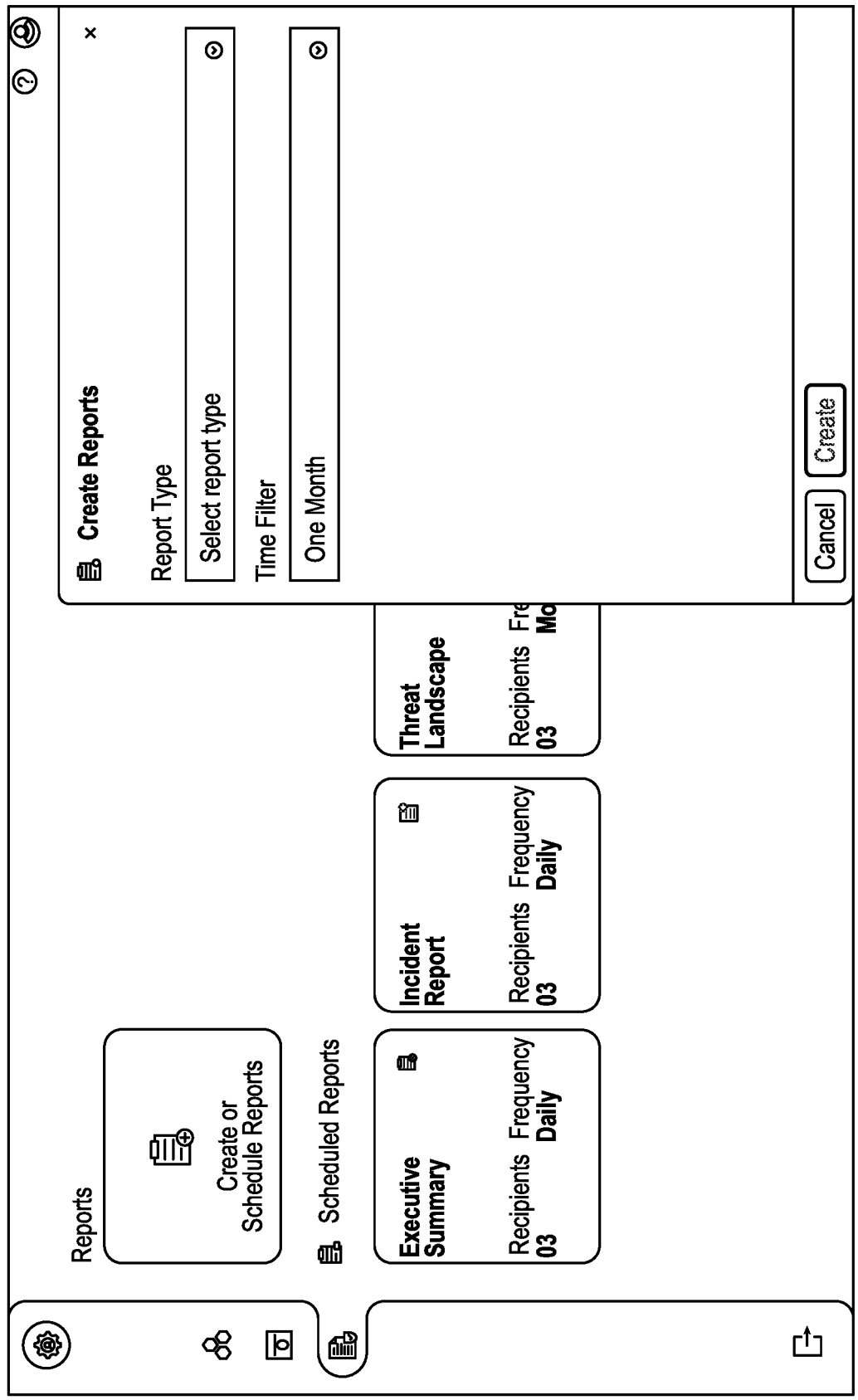

FIGS. 24-27 show an example of a dashboard view of the management console for managing the reports to be delivered to endpoints. FIG. 24 shows an example of dashboard for creating, scheduling, or editing reports. For example, an administrator may schedule executive summary, incident report, threat landscape report or endpoints report to be delivered to end users. FIG. 25 shows an example of dashboard for editing scheduled reports. An administrator may edit, delete or download a selected report. FIG. 26 shows an example of dashboard for scheduling reports. An administrator may set the report type (e.g., incident report, executive summary, threat landscape, endpoints, etc.), frequency of delivering the report (e.g., daily, weekly, monthly, etc.), time filter, and recipients of the reports. FIG. 27 shows an example of dashboard for creating reports. An administrator may create a report by specifying the report type (e.g., incident report, executive summary, threat landscape, etc.), and time filter.

Figure 28:
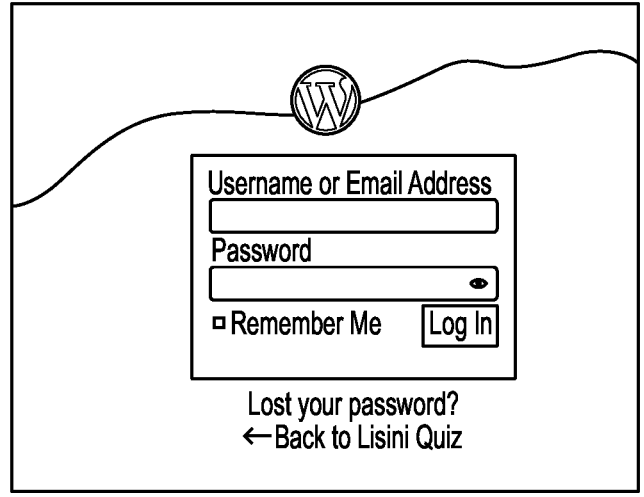
FIG. 28 shows an example of email notification delivered to an admin user in response to detection of a threat.

FIG. 28 shows an example of email notification delivered to an admin user in response to detection of a threat. The email notification may include an image/screenshot of the blocked webpage and detailed information such as the threat name, blocked URL, and the attack target (e.g., target user, target device, etc.).

Figure 29:
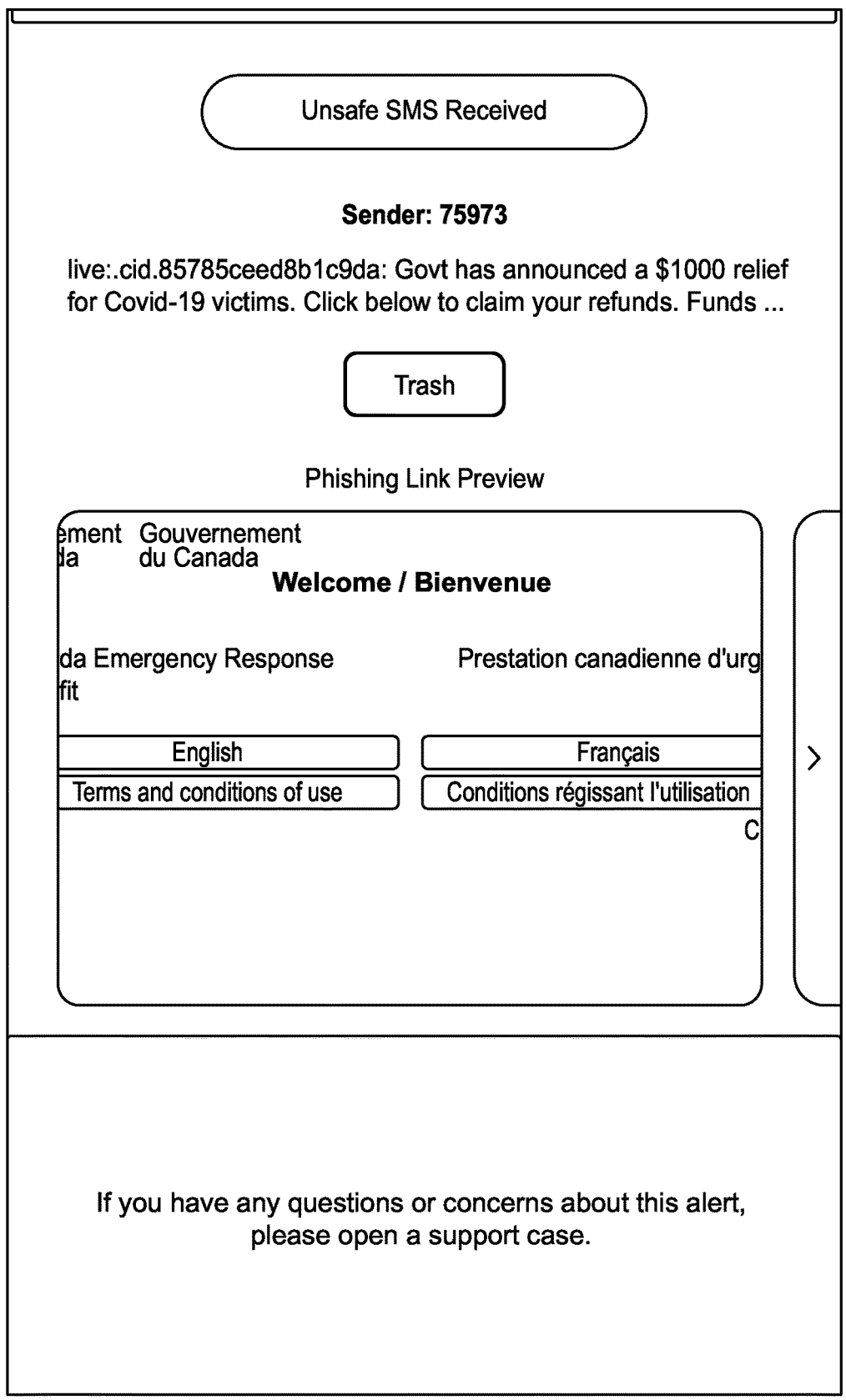
FIG. 29 shows an example of a warning alert generated in response to detection of a phishing SMS.

FIG. 29 shows an example of a warning alert generated in response to detection of a phishing SMS. The warning alert may include an image/screenshot of the malicious link or webpage delivered through the phishing SMS and detailed information such as the sender number and content of the SMS.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. An endpoint protection system comprising:
(a) an endpoint agent deployed to an endpoint device, wherein the endpoint agent is built into one or more existing applications running on the endpoint device and wherein the endpoint device comprises at least one processor, a memory, and a computer program including instructions executable by the at least processor to implement the endpoint agent that is configured to detect a phishing attack using a set of machine learning algorithm trained classifiers, block the phishing attack, provide a graphical user interface (GUI) running on the endpoint device allowing an end user to configure one or more protections provided by the endpoint agent and provide a safe preview of the blocked phishing attack within the GUI, wherein the safe preview of the blocked phishing attack is generated based on artifacts from a virtual browser memory by loading a potentially malicious webpage into the virtual browser memory, wherein the potentially malicious webpage is identified based on a network session activity between the endpoint device and one or more internet servers; and
(b) an endpoint management system in remote communication with the endpoint agent, wherein the endpoint management system comprises at least one processor configured to execute instructions stored on a memory of the endpoint management system to train and develop the set of classifiers.

2. The endpoint protection system of claim 1, wherein the endpoint agent is configured to further send a request to the endpoint management system for determining whether the potentially malicious webpage is benign or malicious.

3. The endpoint protection system of claim 1, wherein the potentially malicious webpage is further analyzed using a virtual browser technique.

4. The endpoint protection system of claim 3, wherein the virtual browser technique comprises loading the potentially malicious webpage into the virtual browser memory and extracting forensic intelligence on a behavior of the potentially malicious webpage.

5. The endpoint protection system of claim 1, wherein the one or more existing applications include a web browser and the endpoint agent is a web browser extension.

6. The endpoint protection system of claim 1, wherein the endpoint management system is configured to further receive information about the detected phishing attack and an incident report from the endpoint agent.

7. A method for providing endpoint protection comprising:
deploying an endpoint agent to an endpoint device, wherein the endpoint agent is built into one or more existing applications running on the endpoint device and wherein the endpoint device comprises at least one processor, a memory, and a computer program including instructions executable by the at least processor to implement the endpoint agent;

detecting a phishing attack using a set of machine learning algorithm trained classifiers;

blocking, by the endpoint agent, the phishing attack and providing a graphical user interface (GUI) running on the endpoint device allowing an end user to configure one or more protections provided by the endpoint agent, wherein a safe preview of the blocked phishing attack is provided within the GUI and wherein the safe preview of the blocked phishing attack is generated based on artifacts from a virtual browser memory by loading a potentially malicious webpage into the virtual browser memory, wherein the potentially malicious webpage is identified based on a network session activity between the endpoint device and one or more Internet servers; and training and developing the set of classifiers in an endpoint management system that is in remote communication with the endpoint agent.

8. The method of claim 7, further comprising sending a request to the endpoint management system for determining whether the potentially malicious webpage is benign or malicious.

9. The method of claim 7, further comprising analyzing the potentially malicious webpage using a virtual browser technique.

10. The method of claim 9, wherein the virtual browser technique comprises loading the potentially malicious webpage into the virtual browser memory and extracting forensic intelligence on a behavior of the potentially malicious webpage.

11. The method of claim 7, wherein the one or more existing applications include a web browser and the endpoint agent is a web browser extension.

12. The method of claim 7, further comprising receiving, at the endpoint management system, information about the detected phishing attack and an incident report from the endpoint agent.

* * * * *